(12) United States Patent
Lauer et al.

(10) Patent No.: US 6,243,098 B1
(45) Date of Patent: Jun. 5, 2001

(54) VOLUME RENDERING PIPELINES

(75) Inventors: Hugh C. Lauer, Concord; Randy B. Osborne, Newton; Hanspeter Pfister, Somerville, all of MA (US)

(73) Assignee: Terarecon, Inc., San Mateo, CA (US)

( * ) Notice: Subject to any disclaimer, the term of this patent is extended or adjusted under 35 U.S.C. 154(b) by 0 days.

(21) Appl. No.: 09/318,344

(22) Filed: May 25, 1999

Related U.S. Application Data

(63) Continuation of application No. 08/905,238, filed on Aug. 1, 1997, now Pat. No. 6,008,813.

(51) Int. Cl.$^7$ ..................................................... G06T 15/00

(52) U.S. Cl. ........................................... 345/424; 345/419

(58) Field of Search ................................... 345/418, 419, 345/423, 424, 425, 427

(56) References Cited

U.S. PATENT DOCUMENTS

| 5,724,493 | * | 3/1998 | Hosoya et al. | 345/424 |
| 6,014,143 | * | 1/2000 | Naqvi et al. | 345/421 |
| 6,057,847 | * | 5/2000 | Jenkins | 345/422 |

* cited by examiner

Primary Examiner—Cliff N. Vo
(74) Attorney, Agent, or Firm—Dirk Brinkman

(57) ABSTRACT

An apparatus renders a volume data set including a plurality of voxels stored in a voxel memory. The apparatus includes a plurality of pipelines operating in parallel. Each pipeline includes a buffer storing at least one block of at least two voxels of the volume data set. An interpolation stage reads the at least one block of at least two voxels from the buffer. A gradient estimation stage receives an output from the interpolation stage. A compositing stage receives an output from the gradient estimation stage. The apparatus also includes a plurality of interface devices, wherein each interface device couples a particular stage only to an adjacent identical stage in a neighboring pipeline so that identical stages of the pipelines are connected in a ring.

10 Claims, 19 Drawing Sheets

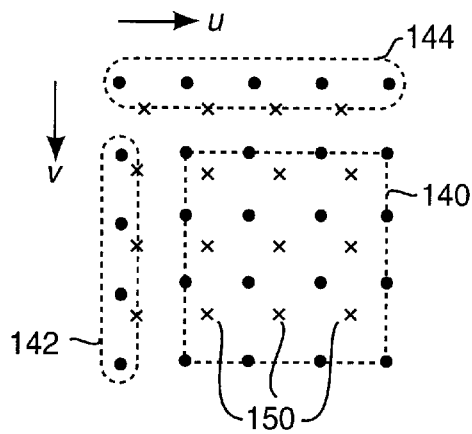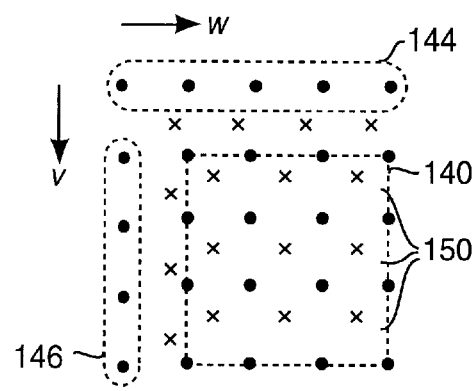
FIG. 15a  FIG. 15b
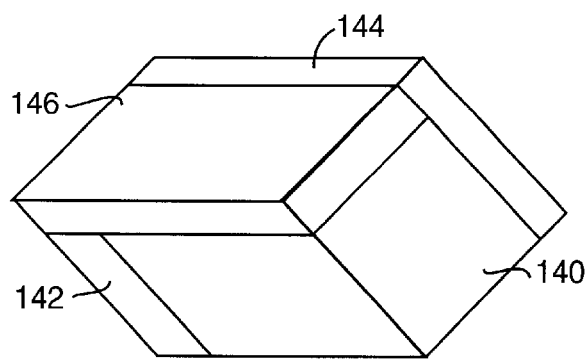
FIG. 15c

VOLUME RENDERING PIPELINES

CROSS REFERENCE TO RELATED PATENT

This is a continuation of Ser. No. 08/905,238, filed Aug. 1, 1997, now U.S. Pat. No. 6,008,813 issued to Lauer et al. on Dec. 28, 1999.

FIELD OF INVENTION

This invention relates to volume graphics and more particularly to a method and apparatus for processing voxel-based data in real time and for creating visual images of objects represented by the data.

BACKGROUND OF THE INVENTION

Volume graphics is the subfield of computer graphics that deals with the visualization of objects or phenomena represented as sampled data in three or more dimensions. These samples are called volume elements, or "voxels," and contain digital information representing physical characteristics of the objects or phenomena being studied. For example, voxel data for a particular object may represent density, type of material, temperature, velocity, or some other property at discrete points in space throughout the interior and in the vicinity of the object.

Voxel-based representations of objects occur in many situations and applications. For example, tomographic scans and nuclear magnetic resonance scans of a human body or industrial assembly produce three dimensional arrays of data representing the density and type of the material comprising the body or object. Likewise, seismic data collected from earthquakes and controlled explosions is processed into three dimensional arrays of data representing the types of soil and rock beneath the surface of the earth. In pre-natal health care, ultrasound scans of a human fetus in the womb produce 3-D sampled data for non-invasive examination and diagnostic purposes. Still another example is the modeling of the flow of air over an aircraft wing or through a jet engine, which also results in discrete samples of data at points in three dimensional space that can be used for design and analysis of the aircraft or engine.

It is natural to want to see images of objects represented by voxels. In the past, two methods have been available for this purpose. One method is to construct a series of parallel two-dimensional image slices, each representing a slightly different cross section of the object being viewed. This is the method typically used by radiologists when viewing computed tomography scans or nuclear magnetic resonance scans of the human body. Radiologists are trained to construct three-dimensional mental pictures of the internal organs of the body from these series of two-dimensional images. The slices are, in general, parallel to one of the primary dimensions or axes of the body, so that they represent the "sagittal," "axial," and "coronal" views that are familiar to radiologists. This method of visualizing voxel-based data is difficult, requires years of training, and is prone to uncertainty, even by the most expert practitioners.

Another method is to convert voxel data into representations suitable for computer graphics systems to display. Most computer graphic systems today are designed to display surfaces of objects by subdividing those surfaces into small triangles or polygons. These triangles are assigned colors and levels of transparency or opacity, then converted into pixels, that is picture elements, and projected onto the computer screen. Triangles corresponding to surfaces in the foreground obscure those corresponding to surfaces in the background. Triangles can also be colored or painted with textures and other patterns to make them look more realistic. Additional realism is made possible by simulating the position and effects of lights, so that highlights and shadows appear on the resulting image. The art and science of this kind of graphics system is well-developed and described by a large body of literature such as the textbook "Computer Graphics: Principles and Practice," $2^{nd}$ edition, by J. Foley, A. vanDam, S. Feiner, and J. Hughes, published by Addison-Wesley of Reading, Mass., in 1990.

This kind of polygon-based graphics system is especially suitable for displaying images of objects that are represented as computer models of their surfaces, such as architectural or mechanical drawings. However, it is less appropriate for visualizing objects represented by 3-D sampled data or voxels, because the process of converting the samples to triangles or polygons is itself computationally expensive. Many algorithms exist for performing the conversion from voxels to polygons, including the famous Marching Cubes algorithm described by W. E. Lorensen and H. E. Cline in a paper entitled "Marching Cubes: A high-resolution 3D surface construction algorithm," presented in *Computer Graphics*, the Proceedings of the 1987 SIGGRAPH Conference, pages 163–169. All of these algorithms suffer the problem of losing detail of the surface, something that would be intolerable in applications such as medical imaging and others.

In recent years, an alternative method has emerged called volume rendering. This method is a form of digital signal processing in which the individual voxels of a voxel-based representation are assigned colors and levels of transparency or opacity. They are then projected on a two-dimensional viewing surface such as a computer screen, with opaque voxels in the foreground obscuring other voxels in the background. This accumulation of projected voxels results in a visual image of the object. Lighting calculations can be done on the individual voxels to create the appearance of highlights and shadows in a similar manner to that of conventional computer graphics.

By changing the assignment of colors and transparency to particular voxel data values, different views of the exterior and interior of an object can be seen. For example, a surgeon needing to examine the ligaments, tendons, and bones of a human knee in preparation for surgery can utilize a tomographic scan of the knee and cause voxel data values corresponding to blood, skin, and muscle to appear to be completely transparent. In another example, a mechanic using a tomographic scan of a turbine blade or weld in a jet engine can cause voxel data values representing solid metal to appear to be transparent while causing those representing air to be opaque. This allows the viewing of internal flaws in the metal that would otherwise be hidden from the human eye.

The process of creating a viewable image from computer data is called "rendering," and the process of creating a viewable image from voxel data is called "volume rendering." The mechanism for mapping the data values of individual voxels to colors and transparencies is called a "transfer function."

a) Projection of Voxel Data

There are a number of techniques to take the data points or voxels representing an object and project them onto a flat viewing surface such as a computer screen. In each of these techniques, an object to be viewed is positioned relative to the viewing surface by translating the three dimensional sampled data representing that object to the spatial coordinates of the space in front of or behind the viewing surface.

The techniques are different methods of computing the color and intensity of the light at discrete points or "pixels" on that viewing surface.

One technique is to compute a series of fast Fourier transforms of the voxel data, combine them, then compute the inverse Fourier transform to obtain the resulting two-dimensional image. This is described by T. Malzbender in U.S. Pat. No. 5,414,803 entitled "Method Utilizing Frequency Domain Representation for Generating Two-Dimensional Views of Three-Dimensional Objects."

A second technique called "splatting" was described by L. A. Westover in a Doctoral Dissertation entitled "Splatting: A Parallel, Feed-Forward Volume Rendering Algorithm" presented to and published by the Department of Computer Science of the University of North Carolina in July 1991, Technical Report number TR91-029. In the splatting technique, each individual voxel of a set of three-dimensional sampled data is projected in the direction of the eye of the viewer. The colors and transparency of the projected voxel are mathematically combined with the pixels of the viewing surface in the immediate region surrounding the point where that projection intersects that computer screen. When all voxels are thus accumulated, the resulting image appears to be a two-dimensional picture of a three-dimensional object.

A third technique is to convert the three-dimensional set of data into a so-called "texture map" and then to store it in the texture map memory that can be found in certain types of modern computer systems. Then this texture map is used to "paint" or "color" a series of parallel planes, each perpendicular to the viewing direction, so that each appears to be a cross-section of the object in question. These planes are then mathematically combined by the graphics subsystem of the computer system to form an image of what appears to the viewer to be a three dimensional object. This method is described in detail in a paper entitled "Accelerated volume rendering and tomographic reconstruction using texture mapping hardware," presented by B. Cabral, N. Cam, and J. Foran at the "Workshop on Volume Visualization" in 1991. It is further described by T. J. Cullip and U. Neumann in a technical report number TR93-027 entitled "Accelerating volume reconstruction with 3D texture mapping hardware," published by the Department of Computer Science of the University of North Carolina at Chapel Hill.

A fourth technique is called "ray-casting." In this technique, imaginary rays are passed from the eye of the viewer through the exact center of each pixel of the viewing surface, then through the object to be viewed. Each ray which passes through the volume is "loaded up" with the visual characteristics of each point along its path. As the ray passes-through the volume, its total characteristic is the sum or mathematical integral of the characteristics of all of the points along the ray. This sum or integral is then assigned to the pixel through which the ray passes, causing a point of light to appear on the viewing surface. The accumulation of all such rays produces a visible image on the viewing surface.

When rays come through a volume, some pass between points represented by the three dimensional sampled data, not intersecting them exactly. It will be appreciated that these "missed" data points or voxels are not reflected in the color or intensity of the pixel corresponding to any ray. In order to solve this missed data-point problem, interpolation techniques are utilized to synthetically generate values from voxels in the immediate neighborhoods of the missed points. In one example, a synthetic value is generated for each plane of sample points or voxels crossed by the ray by the mathematical method of bilinear interpolation of the values of the four nearest voxels in that plane. In another example, synthetic points are generated with uniform spacing along the ray by the mathematical method of trilinear interpolation of the eight nearest voxels surrounding each point. In these ways, as the ray passes through the object, the characteristics accumulated along the way take into account characteristics of the nearest neighbors to synthetically generate a value for the missed point. It will be appreciated that there are many possibe ways of generating synthetic points and that these have a significant bearing on the quality and realism of the projected image.

In order for a two-dimensional picture to-be perceived by the human eye as the image of a three-dimensional object or scene, it is important for the picture to include the effects of lighting and shadows. This is the subject of extensive literature in computer graphics, including the aforementioned textbook by J. Foley, al. Most techniques revolve around the notion of finding the "normal vector" or perpendicular direction to each point on each surface of the object being displayed, then making calculations based on these normal vectors and on the positions of the viewer and the light sources in order to illuminate those points, creating the effect of highlights and shadows.

Whereas in conventional computer graphics based on polygons and surfaces, these normal vectors can be calculated directly from the mathematical models of the surfaces, in volume graphics the normal vectors must be extracted from the sampled data itself. This must be done for each voxel, for example, by examining the values of the other voxels in its immediate neighborhood. At the boundaries of different materials, for instance different tissues, there will be significant differences or gradients in the values of the neighboring voxels. From these differences, the normal vectors can be calculated. Then whenever one type of material is transparent while an adjacent material is opaque, the projection can make clear the edges and surfaces between the different materials. Moreover, the lighting calculations based on these normal vectors can emphasize the irregularities of these surfaces in such a way as to be recognizable by the human eye as three dimensional. For instance, ridges in the grey matter making up the brain can be clearly displayed in this manner from a tomographic scan by simply making the skin and bone of the skull transparent.

b) Computational Requirements

It will be appreciated that all four of the above techniques for projecting voxel data onto a computing surface require massive amounts of computation and have been heretofore unsuitable for equipment of the size and cost of personal or desktop computers. Moreover, they involve the invocation of many different techniques in order to render the volume in a manner useful, for instance, in medical diagnosis. In general, each voxel of a three dimensional data set must be examined at least once to form the projected image. If the sampled data set were a cube with 256 data points on a side, this being a typical size for current tomographic and nuclear magnetic resonance scans for medical purposes, then a total of $256^3$ or approximately 16 million voxels must be evaluated. If, however, the sampled data set were a cube with 4096 data points on a side, this being typical of geological data used in exploration for oil and gas, then a total of $4096^3$ or approximately 64 billion voxels must be evaluated, just to render a single image.

It will be further appreciated that if rendering static images of static data is computationally expensive, this pales into insignificance when considering the computational power required to render objects that move, rotate, or change in some other way. Many applications need visualization of, objects that appear to move in real time, which means rendering on the order of 30 frames per second. That is, each voxel must be re-evaluated or projected 30 times per second. For a volume of $256^3$ data points, this means that data must be retrieved from the sampled data set $256^3 \times 30$ or approximately 503 million times per second. Noting that if the volume rendering were done by a computer program, between 10 and 100 computer instructions would be required per data point per frame. Therefore, the processing power to view rotating or changing volume graphic images is between five and fifty billion operations per second. Note for each doubling of the number of data points on the side of a cubic data set, the required processing power goes up by a factor of eight.

The usual compromise is to sacrifice frame rate or visual quality or cost and size. Presently, the best that one can obtain by rendering a $256^3$ volume in computer software is one to two frames per second on eight ganged processors of the type found in current high-end personal computers. With very expensive computers particularly specialized for graphics and containing very large amounts of texture memory, frame rates of up to fifteen frames per second can be achieved by sacrificing lighting and shadows. Other approaches that actually achieve real-time frame rates of 30 frames per second or more without sacrificing image quality have resulted in very specialized systems that are too large and costly for personal or desktop-size equipment.

c) Reduction in Computational Requirements

In order to improve upon this rather dismal prospect for obtaining real-time volume-rendering at 30 frames per second based on the ray-casting technique, a development by Ari Kaufman and Hanspeter Pfister at State University of New York is described in U.S. Pat. No. 5,594,842, "Apparatus and Method for Real-time Volume Visualization." In this development, improvements can be obtained by passing a large number of rays through a volume in parallel and processing them by evaluating the volume data a slice at a time. If one can do slice-processing fast in specialized electronic hardware, as opposed to software, it has been demonstrated that one can increase from two frames per second to 30 frames per second at a modest cost.

In theory, this is accomplished in hardware through the utilization of a multiplicity of memory modules and specialized processing pipelines. Utilizing large numbers of memory modules and pipelines, one can pick out data in parallel from different memory modules in a system now dubbed "Cube-4" which was described by H. Pfister, A. Kaufmann, and T. Wessels in a paper entitled "Towards a Scalable Architecture for Real-time Volume Rendering" presented at the $10^{th}$ Eurographics Workshop on Graphics Hardware at Masstricht, The Netherlands, on Aug. 28 and 29, 1995, and further described in a Doctoral Dissertation submitted by Hanspeter Pfister to the Department of Computer Science at the State University of New York at Stony Brook in December 1996.

The essence of the Cube-4 system is that the three dimensional sampled data representing the object is distributed across the memory modules by a technique called "skewing," so that adjacent voxels in each dimension are stored in adjacent memory modules. Each memory module is associated with its own processing pipeline. Moreover, voxels are organized in the memory modules so that if there are a total of P pipelines and P memory modules, then P adjacent voxels can be fetched simultaneously, in parallel, within a single cycle of a computer memory system, independent of the viewing direction. This reduces the total time to fetch voxels from memory by a factor of P. For example, if the data set has $256^3$ voxels and P has the value four, then only $256^3 \div 4$ or approximately four million memory cycles are needed to fetch the data in order to render an image.

An additional characteristic of the Cube-4 system is that the computational processing required for volume rendering is organized into pipelines with specialized functions for this purpose. Each pipeline is capable of starting the processing of a new voxel in each cycle. Thus, in the first cycle, the pipeline fetches a voxel from its associated memory module and performs the first step of processing. Then in the second cycle, it performs the second step of processing of this first voxel, while at the same time fetching the second voxel and performing the first step of processing this voxel. Likewise, in the third cycle, the pipeline performs the third processing step of the first voxel, the second processing step of the second voxel, and the first processing step of the third voxel. In this manner, voxels from each memory module progress through its corresponding pipeline in lock-step fashion, one after the another, until they are fully processed. Thus, instead of requiring 10 to 100 computer instructions per voxel, a new voxel can be processed in every cycle.

A further innovative characteristic of the Cube-4 system is that each pipeline communicates only with its nearest neighbors. Such communication is required, for example, to transmit voxel values from one pipeline to the next for purposes of estimating gradients or normal vectors so that lighting and shadow effects can be calculated. It is also used to communicate the values of rays as they pass through the volume accumulating visual characteristics of the voxels in the vicinities of the areas, through which they pass.

This approach of nearest neighbor communication provides the Cube-4 one of its principal advantages, that of being "scalable." That is, in order to accommodate larger amounts of three dimensional sampled data and/or in order to process this data faster, it is only necessary to add more memory modules and pipelines. There are no common busses or other system resources to be overloaded by the expansion.

In the Cube-4 system, volume rendering proceeds as follows. Data is organized as a cube or other rectangular solid. Considering first the face of this cube or solid that is most nearly perpendicular to the viewing direction, a partial row of P voxels at the top corner is fetched from P memory modules concurrently, in one memory cycle, and inserted into the first stage of the P processing pipelines. In the second cycle these voxels are moved to the second stage of their pipelines and/or transmitted to the second stages of adjacent pipelines. At the same time, the next P voxels are fetched from the same row and inserted into the first stage of their pipelines. In each subsequent cycle, P more voxels are fetched from the top row and inserted into their pipelines, while previously fetched voxels move to later stages of their pipelines. This continues until the entire row of voxels has been fetched. Then the next row is fetched, P voxels at a time, then the next and so on, until all of the rows of the face of the volume data set have been fetched and inserted into their processing pipelines.

This face is called a "slice." Then the Cube-4 system moves again to the top corner, but this time starts fetching the P voxels in the top row immediately behind the face, that is from the second "slice." In this way, it progresses through the second slice of the data set, a row at a time and within each row, P voxels at time. After completing the second slice, it proceeds to the third slice, then to subsequent slices in a similar manner, until all slices have been processed. The purpose of this approach is to fetch and process all of the voxels in an orderly way, P voxels at a time, until the entire volume data set has been processed and an image has been formed.

In the terminology of the Cube-4 system, a row of voxels is called a "beam" and a group of P voxels within a beam is called a "partial beam."

The processing stages of the Cube-4 system perform all of the calculations required for the ray-casting technique, including interpolation of samples, estimation of the gradients or normal vectors, assignments of colors and transparency or opacity, and calculation of lighting and shadow effects to produce the final image on the two dimensional view surface.

The Cube-4 system was designed to be capable of being implemented in semiconductor technology. However, two limiting factors prevent it from achieving the small size and low cost necessary for personal or desktop-size computers, namely the rate of accessing voxel values from memory modules and the amount of internal storage required in each processing pipeline. With regard to the rate of accessing memory, current semiconductor memory devices suitable for storing a volume data set in a Cube-4 system are either too slow or too expensive or both. Much cheaper memory solutions are needed for a practical system usable in a personal or desktop computer. With regard to the internal storage, the Cube-4 algorithm requires that each processing pipeline store intermediate results within itself during processing, the amount of storage being proportional to the area of the face of the volume data set being rendered. For a $256^3$ data set, this amount turns out to be so large that it would increase the size of a single-chip processing pipeline by an excessive amount and therefore to an excessive cost for a personal computer system. A practical system requires a solution for reducing this amount of intermediate storage.

d) Blocking and SRAM Technology

In other experimental systems designed at about the same time as Cube-4, these limitations have been ignored. One such system is called "DIV$^2$A," the Distributed Volume Visualization Architecture, and was described in a paper by J. Lichtermann entitled "Design of a Fast Voxel Processor for Parallel Volume Visualization" presented at the $10^{th}$ Eurographics Workshop on Graphics Hardware, Aug. 28 and 29, 1995, at Maastricht, The Netherlands. Another such system is the VIRIM system, described by M. deBoer, A. Grȫpl, J. Hesser, and R. Männer in a paper entitled "Latency- and Hazard-Free Volume Memory Architecture for Direct Volume Rendering," presented at the $11^{th}$ Eurographics Workshop on Graphics Hardware on Aug. 26–27, 1996, in Poitiers, France.

The DIV$^2$A system comprises sixteen processing pipelines connected together in a ring, so that each pipeline can communication directly with its nearest neighbor on each side. Each processing pipeline has an associated memory module for storing a portion of the volume data set. Voxels are organized into small subcubes, and these subcubes are distributed among the memory modules so that adjacent subcubes are stored in adjacent memory modules in each of the three dimensions. However, in order to achieve the required memory access rate for rendering a $256^3$ data set at 30 frames per second, the DIV$^2$ A system requires eight parallel memory banks within each memory module. Moreover, each memory bank is implemented with a Static Random Access Memory or SRAM device.

In current semiconductor technology, SRAM devices are very fast, so they can support high rates of data access, but they are also very expensive, very power-hungry, and have limited capacity. Since the DIV$^2$A system requires eight of these per processing pipeline and has sixteen processing pipelines, a total of 128 SRAM devices are needed, just to store the voxels of a $256^3$ volume data set. It will be appreciated that this far exceeds the physical size and power limitations of a board that could be plugged into the back of a personal computer. Systems such as DIV$^2$A and VIRIM are the size of a drawer of a file cabinet, not including the desktop computer to which they are connected.

SUMMARY OF THE INVENTION

In order to make real-time volume rendering practical for personal and desktop computers, the subject invention further improves upon the Cube-4 system by providing techniques including architecture modification to permit the use of high capacity, low cost Dynamic Random Access Memory or DRAM devices for memory modules. DRAM devices or "chips" are capable of storing five to ten times more information per chip than SRAM devices, cost five to ten times less per bit of information stored, and required considerably less power to operate. DRAM devices are currently available with capacities of 4, 16, and 64 megabits. Utilizing four 64-megabit DRAMs, only four chips are needed to store a data set of $256^3$ voxels with sixteen bits per voxel. By coupling four DRAM modules with four custom designed semiconductor devices for processing pipelines, the subject invention makes it possible to implement a real-time volume rendering system on a board that can be plugged into the back of personal computer.

However, DRAM devices or chips are also much slower than SRAM devices. Normally, a DRAM chip can support only eight to twelve million accesses per second, versus 50 to 200 million per second for an SRAM chip. Therefore, although four DRAM devices have enough capacity to store a volume data set of $256^3$ voxels, together they can support only about 32 to 48 million accesses per second, far fewer than the data rate of 503 million accesses per second needed to render the data set at 30 frames per second.

In order to achieve the benefits of the high capacity and low cost of DRAMs, the subject invention utilizes DRAM chips that support "burst mode" access. This feature is now found in some DRAM products and enables access rates as fast as those of SRAM devices, but only when accessing consecutive memory locations in rapid sequence. In order to be able to satisfy this condition and therefore to be able to take advantage of burst mode DRAMs, other architectural modifications of the Cube-4 system are required. The subject invention utilizes four techniques for this purpose.

In the first technique, called "blocking," voxel data is organized into blocks so that all voxels within a block are stored at consecutive memory addresses within a single memory module. This makes it possible to fetch an entire block of data in a burst rather than one voxel at a time. In this way, a single processing pipeline can access memory at data rates of 125 million or more voxels per second, thus making it possible for four processing pipelines and four DRAM modules to render $256^3$ data sets at 30 frames per second.

A second technique to improve upon the Cube-4 system is called "sectioning." In this technique, the volume data set is subdivided into sections and rendered a section at a time. Because each section presents a face with a smaller area to the rendering pipeline, less internal storage is required. Moreover, intermediate results from processing individual sections can be stored outside the processing pipeline and later combined with each other to form a complete image of the object being rendered. The effect of this technique is to reduce the amount of intermediate storage in a processing pipeline to an acceptable level for semiconductor implementation.

The third technique reduces the number of pins and the rates at which data must be transmitted across the pins connecting adjacent processing pipelines with each other. This is done by taking advantage of a side-effect of blocking that reduces the amount of data needed to be transmitted per block by a factor of approximately 1/B, where B is the number of voxels on the edge of any block.

A final technique called "mini-blocking" is utilized which further refines the aforementioned sectioning technique. In this technique, the $B^3$ voxels of a block are further organized into small blocks or cubes called mini-blocks of size 2×2×2 each. This makes it possible, when processing the voxels near the boundary between a section and previously processed sections, to avoid reading entire blocks but only read mini-blocks. This saves approximately five to seven percent of the time needed to process a volume in sections.

The overall effect of these four architectural improvements is to enable the implementation of a practical, low cost volume rendering system based on the Cube-4 architecture using DRAM memory modules, thereby reducing its size and cost from that of a small file cabinet to that of a printed circuit board that can be plugged into the back of a personal computer. An additional effect is to make it possible to further shrink the Cube-4 architecture so that a pipeline and its memory can be implemented within the same semiconductor chip. This reduces the size and power requirements of the volume rendering system even more.

More particularly with respect to blocking, current burst mode DRAM devices can operate at more than 125 million accesses per second, but only while fetching data from consecutive memory addresses. Minimum burst sizes are at least eight consecutive accesses but are often more. This data rate is sufficient for four pipelines to render a $256^3$ data set at 30 frames per second, or approximately 503 million voxels per second. However, burst mode will only work if data can be organized in memory so that consecutive accesses are at consecutive addresses for at least a minimum burst size.

In Cube-4 as originally presented, this is not possible for most viewing directions. From at least one third of the viewing directions, consecutive voxels are accessed from memory locations N addresses apart, where N is the number of voxels on the edge of a cubic data set. From another third of the viewing directions, consecutive voxels are accessed from addresses $N^2$ apart. The result is that even a burst mode DRAM device is reduced to its slowest mode, that of accessing random addresses. In this mode, a DRAM device can support only about eight to twelve million accesses per second.

This problem can be solved by organizing voxel data in such a way that no matter from what direction the object is viewed, bursts of voxels can be fetched from consecutive memory addresses. To do this, voxel data is grouped into small cubes or blocks with B voxels on a side, so that all of the voxels of a block of size B×B×B are stored at consecutive addresses within a single memory module. Although any value for B can be used, values of B equal to four or eight are most practical.

In order to preserve the Cube-4 characteristic that rendering is independent of the view direction, data must still be skewed across memory modules. However, instead of skewing by voxel as in Cube-4, data in the subject invention is skewed by block. In particular, adjacent blocks in any of the three dimensions of the volume data set are stored in adjacent memory modules. This makes it possible for P adjacent processing pipelines to fetch P adjacent blocks of voxels in burst mode from P adjacent memory modules, all concurrently and simultaneously. Each pipeline renders all of the voxels in a block, then they all step to their respective next blocks, in much the same way as the Cube-4 processing pipelines step to their respective next voxels. In this scheme, the order of processing individual voxels is not the same in the subject invention as the order in the Cube-4 system, so important modifications to the Cube-4 algorithm are necessary.

With regard to sectioning, this deals with the issue of the amount of storage needed for intermediate results in a processing pipeline. In both the Cube-4 system and the modifications introduced in the subject invention, the required amount of intermediate storage is approximately proportional to $N^2/P$, where N is the number of voxels on a side of a cubic data set and P is the number of memory modules and pipelines. The reason for this ratio is that in order to compute gradients or normal vectors according to the Cube-4 algorithm, it is necessary to mathematically combine the values of voxels of the slice being currently processed along with the values of voxels fetched in the two previous slices. Similarly, in order to compute trilinear interpolations to obtain values for "missed data points" along the rays, it is necessary to mathematically combine values of voxels from the slice being processed with values from the slice previously processed. The net effect is that each pipeline must remember the voxels from one or two previously read slices in order to complete the processing of a current slice. For a cubic data set with N voxels on a side, the number of voxel values needed to be retained is proportional to the number of voxels in a slice, that is, to $N^2$ However, this data is distributed across P processing pipelines, so that this number is reduced to $N^2/P$. The constant of proportionality is typically more than three.

More generally, if the voxel data set represents a rectangular solid of arbitrary proportions, the amount of data that must be stored from slice to slice is proportional to the area of the face most nearly perpendicular to the view direction.

It will be appreciated that for current semiconductor technology, this is much too much data to fit economically on one processing chip. In particular, if N is 256 and P is 4, then the amount of storage required in the Cube-4 system is at least $3 \times 256^2 \div 4$, or almost 50,000 voxels, equivalent to approximately 800,000 bits for 16-bit voxel values. While this amount of storage can be easily achieved with SRAM or DRAM semiconductor technology, it would result in an excessively large semiconductor device in current technology appropriate for processing units, and therefore it would be too expensive for personal and desktop computing environments.

To solve this problem, the volume data set is partitioned into sections by subdividing it perpendicular to the face of the volume nearest to the viewing direction, each such subdivision being called a "section." Sections are rendered separately from other sections, almost as if they were independent volume data sets. When rendering a section, some rays pass through the section and out the back. The visual characteristics of these rays, i.e., color, brightness, and transparency, are assigned directly to the corresponding pixels of the viewing surface. Other rays, however, pass out of a side, top, or bottom surface of the section and into an adjacent section. The visual characteristics of these rays must be saved and utilized when rendering the continuation of the same rays in the adjacent section. To save these rays, a processing pipeline of the subject invention writes them into an external storage module. Later, as it begins processing the adjacent section, it re-reads them to initialize the visual characteristics of their continuations.

The net effect is to reduce the amount of storage required within the processing pipeline to an amount proportional to the surface area of the face of the largest section. Conversely, the size of a section can be chosen based on the amount of available memory. In the subject invention, a section is approximately one quarter to one eighth of the entire volume data set.

An additional benefit of sectioning is in rendering voxel data sets that are larger than the total amount of memory in the volume memory modules. This can be done by rendering the voxel data set a section at a time. After earlier sections are rendered and their data are no longer needed, later sections are loaded into the volume memory modules, over-writing the earlier sections. These later sections are then processed, while still others sections are loaded, etc. In this way, an entire large volume data set can be passed through a smaller volume memory during the rendering processed, and the resulting image can be accumulated in the external memory modules. The size of the largest volume data set that can be thus processed is limited only by the storage capacity of the in the external memory modules.

With regard to the number of pins needed to interconnect adjacent processing pipeline chips, these represent a significant component of the cost of a semiconductor device. The Cube-4 algorithm requires several hundred pins to transmit information between adjacent pipelines. These pins carry values of voxels, values computed from several voxels, and the partial accumulation of the characteristics of each ray.

In the Cube-4 algorithm, one data element must be transmitted across each set of pins for each voxel read from memory. With voxels being read in burst mode from DRAM memory at 125 megahertz, that is 125 million voxels per second, this implies a circuit with several hundred pins operating 125 MHz between each pair of processing pipelines. This presents a serious challenge to designer of the circuit board that contains the volume rendering system.

The solution in the subject invention is to take advantage of a side effect of the blocking algorithm, namely the reduction by a factor of approximately 1/B of the amount of data transmitted between adjacent pipelines. This reduction occurs because data needs only to be transmitted from the voxels on the face of each block to adjacent processing pipelines. Data from voxels interior to a block are utilized only within each block. It will be appreciated that for every $B^3$ voxels in a block, there are only $B^2$ voxels on each face of that block. Therefore, the number of pieces of information that need to be transmitted to neighboring pipelines is proportional to $B^2$. This results in reduction of the communication between pipeline by a factor of approximately $B^2/B^3$, that is 1/B. This factor of 1/B can be applied either to reducing the bandwidth of the transmitted data on individual pins or to reducing the number of pins by multiplexing. Note that any of a number of widely known multiplexing techniques may be utilized in this regard.

It will be appreciated that in order to process a section, the values of immediately adjacent voxels of previously processed sections are utilized. These are combined mathematically with voxel values of the section being processed to obtain gradients or normal vectors in the vicinity of the edge of the section and to obtain values for "missed points" between two sections. One way to obtain these values is to re-read the voxel data of previously processed sections directly from the memory modules holding the volume data set. However, as a result of the aforementioned blocking technique, voxel values are read in bursts of a block at a time. If the value of B, the number of voxels on a side of a block, is greater than two, this causes the sectioning mechanism to re-read too many voxels, thereby wasting time and processing power.

This leads to the fourth technique for improving the Cube-4 system, namely the utilization of mini-blocks and taking advantage of the fact that in some DRAM products, the minimum burst size is eight accesses. In the subject invention, each block is subdivided into mini-blocks of size 2×2×2 voxels such that each mini-block of a block is also stored in consecutive memory locations within its volume memory module. Then as the sectioning mechanism re-reads voxels from previously processed adjacent sections, it needs to re-read only the mini-blocks at the exact boundaries of those adjacent sections, not the entire blocks. It is estimated that this technique saves approximately five to seven percent of the processing time of a volume data set, although the actual savings depends upon the areas of the boundaries of the sections.

It will be appreciated that an apparent simplification of the subject invention would be to set the value of B, the number of voxels on an edge of a block, to two. This would appear to obviate the need for a separate mini-blocking mechanism. However, this simplification is illusory, because the savings in number of data pins between adjacent processing pipelines is determined by the factor 1/B were set to two, this savings would only one-half, an amount insufficient for a low cost implementation. Thus, the economics of semiconductor design and production indicate that B should be set to a larger value, such as eight, and that a separate mini-block scheme should be implemented to avoid wasting time re-reading unnecessary voxels at the boundaries of sections.

In summary, apparatus is provided to enable real-time volume rendering on a personal computer or a desktop computer in which a technique involving blocking of voxel data organizes the data so that all voxels within a block are stored at consecutive memory addresses within a single memory model, making possible fetching an entire block of data in a burst rather than one voxel at a time. This permits utilization of DRAM of memory models which provide high capacity and low cost with substantial space savings. Additional techniques including sectioning reducing the amount of intermediate storage in a processing pipeline to an acceptable level for semiconductor implementation. A multiplexing technique takes advantage of blocking to reduce the amount of data needed to be transmitted per block, thus rendering the number of pins at the rates at which data must be transmitted across the pins connecting adjacent processing modules with each other. Mini blocking saves the time needed to process and sections by avoiding reading entire blocks for voxels near the boundary between a section and previously processed sections.

BRIEF DESCRIPTION OF THE DRAWINGS

These and other features of the Subject Invention will be better understood in connection with the Detailed Description taken in conjunction with the Drawing of which:

FIG. 15 is a diagrammatic illustration the calculation of samples from a block of $B^3$ voxels and voxels forwarded from previously processed blocks.

DETAILED DESCRIPTION

Figure 1:
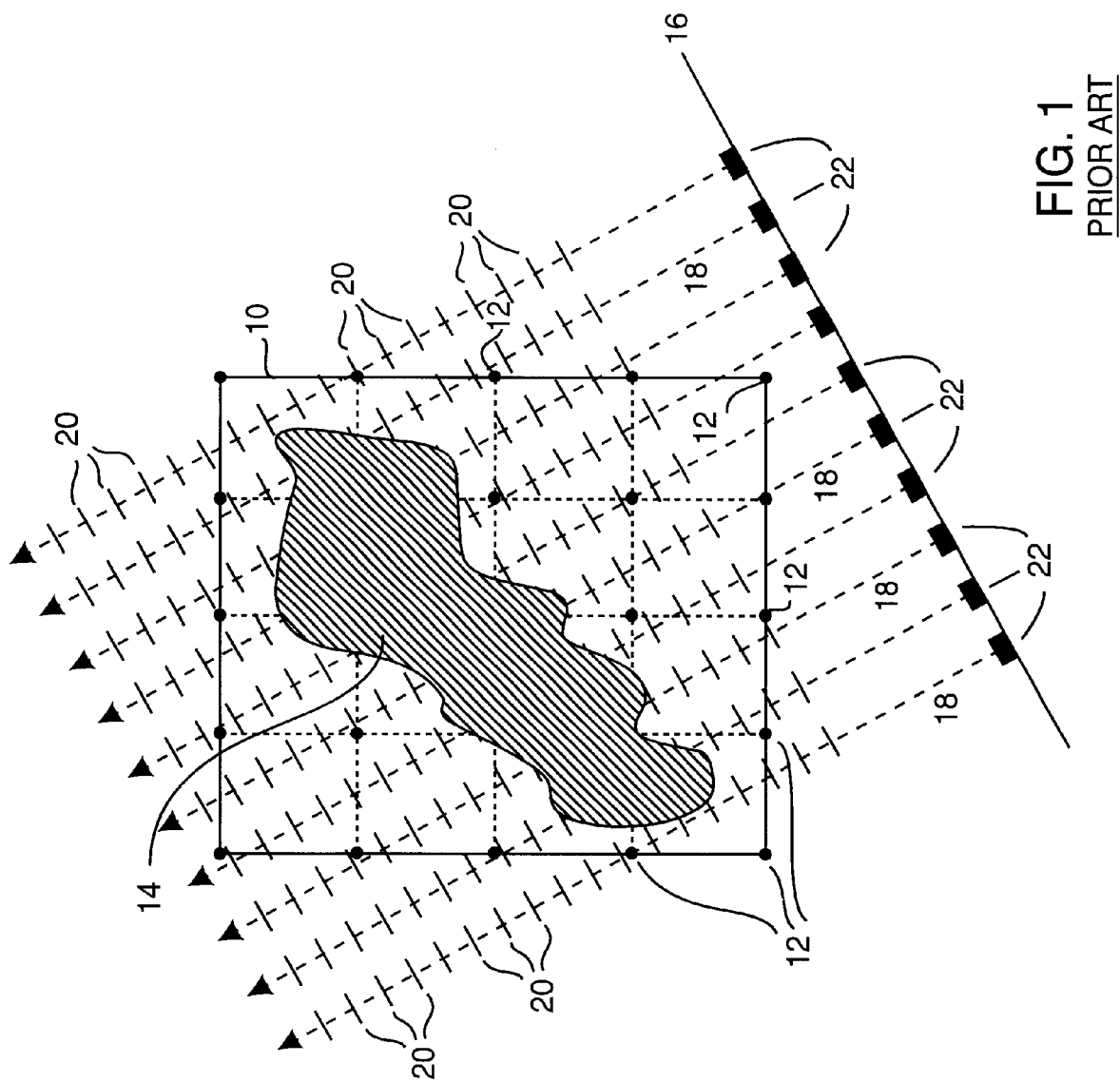
FIG. 1 is a diagrammatic illustration of a view of a volume data set being projected onto an image plane by means of ray-casting.

Referring now to FIG. 1, a two-dimensional view of a three-dimensional volume data set 10 is shown. The third dimension of volume data set 10 is perpendicular to the printed page so that only a cross section of the data set can be seen in the figure. Voxels are illustrated by dots 12 in the figure and are data values that represent some characteristic of a three dimensional object 14 at fixed points of a rectangular grid in three dimensional space. Also illustrated in FIG. 1 is a one-dimensional view of a two-dimensional image plane 16 onto which an image of object 14 is to be formed. In this illustration, the second dimension of image plane 16 is also perpendicular to the printed page.

In the technique of ray-casting, rays 18 are extended from pixels 22 of the image plane 16 through the volume data set 10. Each ray accumulates color, brightness, and transparency or opacity at sample points 20 along that ray. This accumulation of light determines the brightness and color of the corresponding pixels 22.

It will be appreciated that although FIG. 1 suggests that the third dimension of volume data set 10 and the second dimension of image plane 16 are both perpendicular to the printed page and therefore parallel to each other, in general this is not the case. The image plane may have any orientation with respect to the volume data set, so that rays 18 may pass through volume data set 10 at any angle in all three dimensions.

It will also be appreciated that sample points 20 do not necessarily intersect exactly with the fixed points represented by voxels 12. Therefore, the value of each sample point much be synthesized from the values of voxels nearby. That is, the intensity of light, color, and transparency or opacity at each sample point 20 must be calculated by a mathematical function of the values of nearby voxels 12. The sample points 20 of each ray 18 are then accumulated by another mathematical function to produce the brightness and color of the pixel 22 corresponding to that ray. The resulting set of pixels 22 forms a visual image of the object 14 in the image plane 16.

In both the Cube-4 system and in the subject invention, the calculation of the color, brightness or intensity, and transparency of sample points 20 is done in two parts. First, the mathematical function of trilinear interpolation is utilized to take the weighted average of the values of the eight voxels in a cubic arrangement immediately surrounding the sample point 20. The resulting average is then used to assign a color and opacity or transparency to the sample point by some transfer function. Second, the mathematical gradient of the sample values at each sample point 20 is estimated by taking the differences between nearby sample points. This gradient is then used in a lighting calculation to determine the brightness of the sample point.

Figure 2:
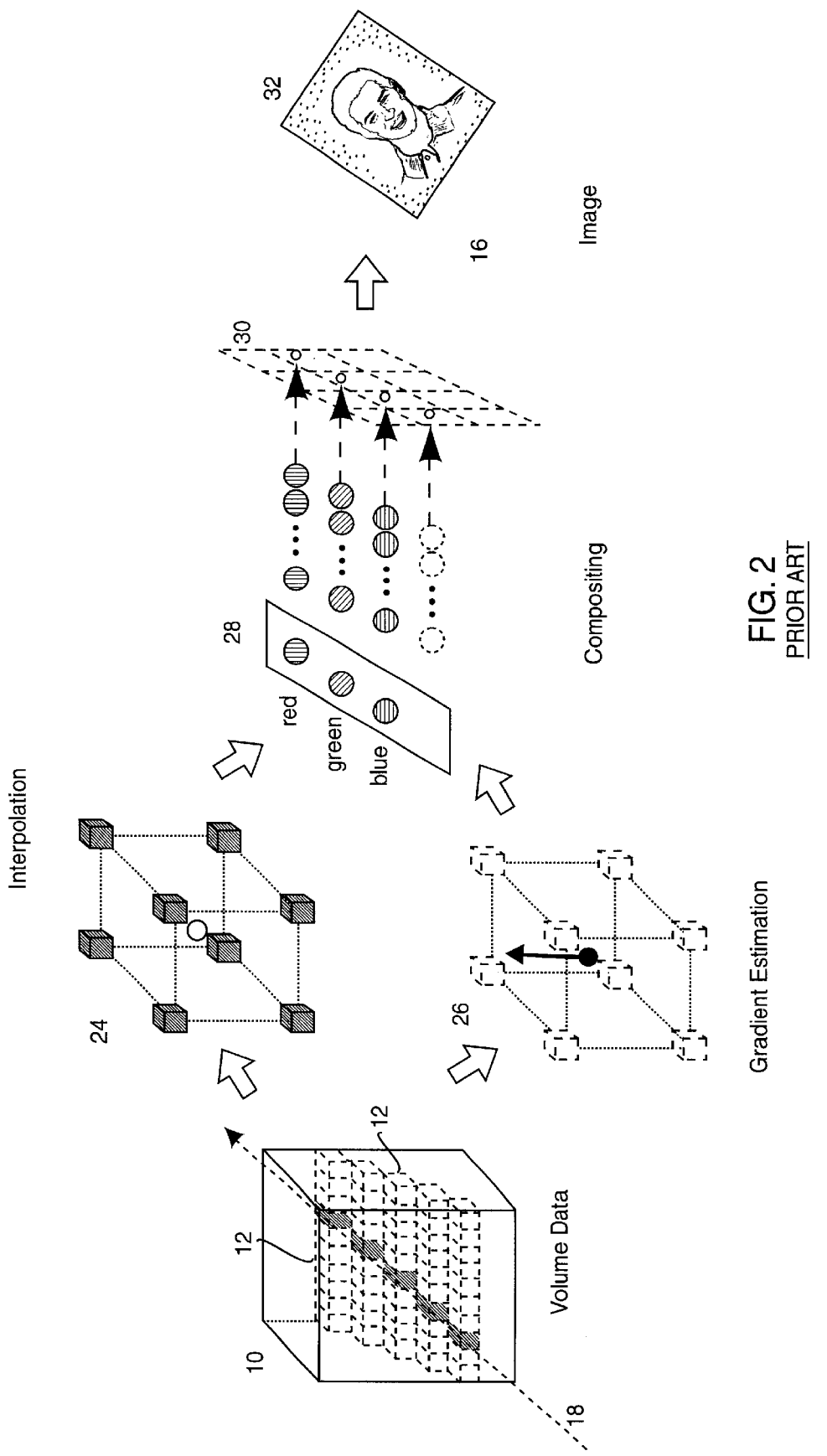
FIG. 2 is a diagrammatic illustration the processing of an individual ray by ray-casting.

FIG. 2 illustrates the processing of an individual ray. Ray 18 passes through the three dimensional volume data set 10 at some angle, passing near voxels 12. Each sample point is calculated by an interpolation unit 24, and its gradient is calculated by a gradient estimation unit 26. The outputs of these are then applied to a transfer function 28 which assigns color, brightness or intensity, and transparency or opacity to each sample. Finally, the colors, levels of brightness, and transparencies assigned to all of the samples along all of the rays are applied to a compositing unit 30 that mathematically combines their values into pixels depicting the resulting image 32 on image plane 16.

a) Parallel Ray-Casting

In order to form different points of view of an object, image plane 16 is moved or re-oriented relative to volume data set 10. It is the goal of the field of interactive volume graphics to recalculate images from volume data sets fast enough from different points of view so that objects appear to move, as if in a motion picture. In addition, the mathematical functions for converting voxels 12 to samples 20 and for accumulating samples into pixels 22 can be modified to provide the appearance of a dynamically changing or transforming three-dimensional object. A typical requirement is to be able to recalculate an image thirty or more times per second.

Figure 3C:
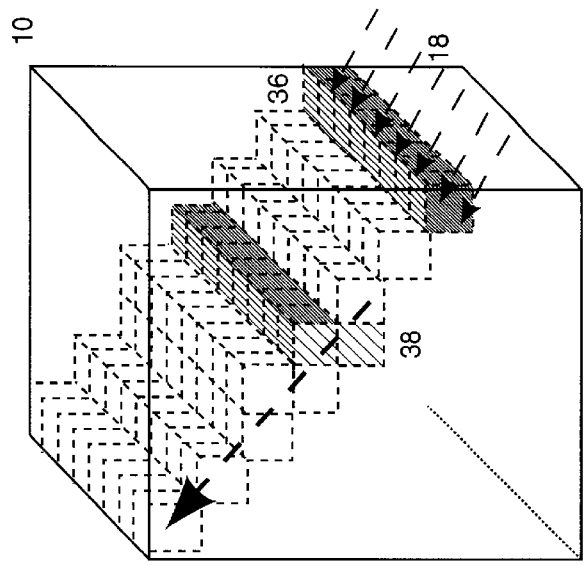
FIG. 3 is a diagrammatic illustration several methods of paralleling the processing of rays in a ray-casting system.

It will be appreciated that the magnitude of recalculation is enormous, even for a small data set of $256^3$ voxels. Therefore, most systems implementing the ray-casting technique utilize parallel processing units and cast a multiplicity of rays through the volume at the same time. FIG. 3 illustrates some potential ways of implementing parallel ray-casting. In FIG. 3A, individual rays 18 are cast through the volume data set 10 independently, stepping through the data set from the front to the back accumulating color, intensity, and opacity an they proceed. Parallelism is achieved by assigning separate rays to separate processing units. For example rays labeled "a" through "g" might be assigned to separate processing units for processing in parallel. This is called the "ray-parallel approach."

The problem with the ray-parallel approach is that the same voxel values are needed to process different rays, often at the same time. For example, the voxel labeled 34 in FIG. 3A is needed in order to process both ray "c" and ray "d." If two independent processing units proceed at their own pace, then the voxel must be fetched from volume data set 10 at least twice. In general, the value of each individual voxel contributes to several rays that pass near it, so each value of the volume data set needs to be fetched several times by separate processors. Since fetching data from a memory module is a time-consuming operation relative to processing data, this approach is slow and expensive. Moreover, even if voxels were distributed across memory modules, it is likely that several processors would be trying to access the same module at the same time. Thus, memory access is the bottleneck to rendering the volume data set to an image.

Figure 3B:
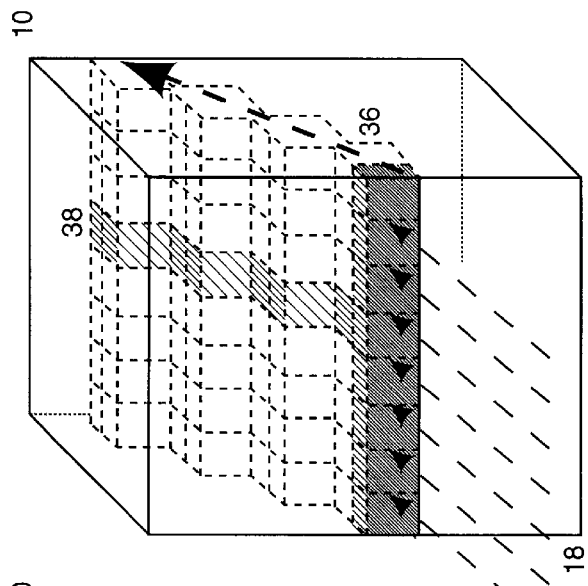
Figure 3A:
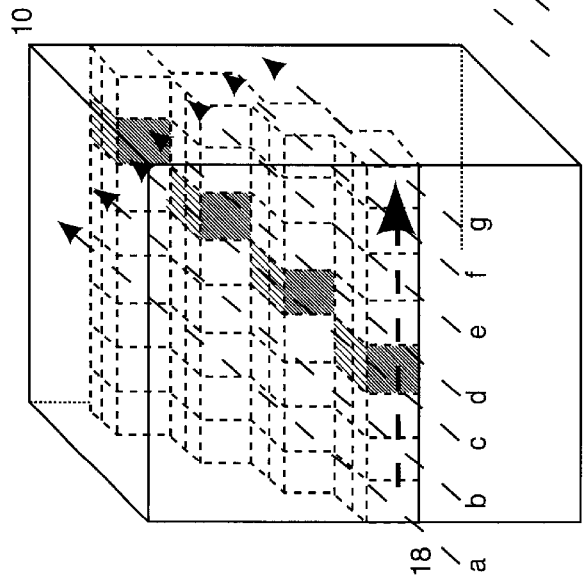

In FIG. 3B, this problem is partly alleviated by casting several rays in parallel through the volume data set 10, with each ray assigned to a processing unit and with all processing units working in lock step. In this technique, called the "beam parallel" approach, the processing units all together fetch a row or "beam" 36 of voxels at the same time. Each processing unit synthesizes sample points and calculates color, intensity, and transparency from the voxel that it has fetched and from the values fetched by its neighbors to the left and right. Then all processing units step forward to the next beam, each processing corresponding voxels of that beam and sharing values with its neighbors. Then they step forward to the next beam, then the next, etc., until all rays have emerged from the volume data set. This is repeated for other beams, starting on the front face of the volume data set until all of the voxels of have been processed.

In order to avoid memory conflicts, the processing units for separate rays should have independent memory modules, and the volume data set should be distributed across the memory modules. For example, the vertical "slice" 38 of voxels in FIG. 3B would be assigned to a separate memory module from the slices on each side. Therefore, its processor could fetch voxels from that memory module while adjacent processing units fetch adjacent voxels from adjacent memory modules concurrently, without memory conflicts. Processing units would, of course, share voxel values with each other in order to synthesize "missed" sample points, calculate normal vectors, and pass rays through the volume at an angle.

This approach works well provided that the rays are roughly parallel to the vertical slices. If, however, the volume is to be viewed from another direction, as illustrated in FIG. 3C, then beam parallel processing fails. In this case, a beam of voxels 36 and the vertical slice 38 are parallel to each other. The result is that all of the voxels of the beam are in the same vertical slice, and therefore they are stored in the same memory module. Thus it would not be possible for a multiplicity of parallel processors to access them all at the same time without clashing over access the that memory module.

Some ray-casting system solve this problem by storing three copies of the volume data set at any given time, one for each orientation or major view direction. One copy is partitioned among memory modules in slices front to back, a second copy is partitioned among memory module side to side, and a third is partitioned among memory modules top to bottom. It will be appreciated that this triples the amount of memory needed to store the volume data set, and it also imposes a burden upon applications to keep all three copies consistent with each other.

b) Slice-Parallel Ray-Casting in Cube-4

Figure 4:
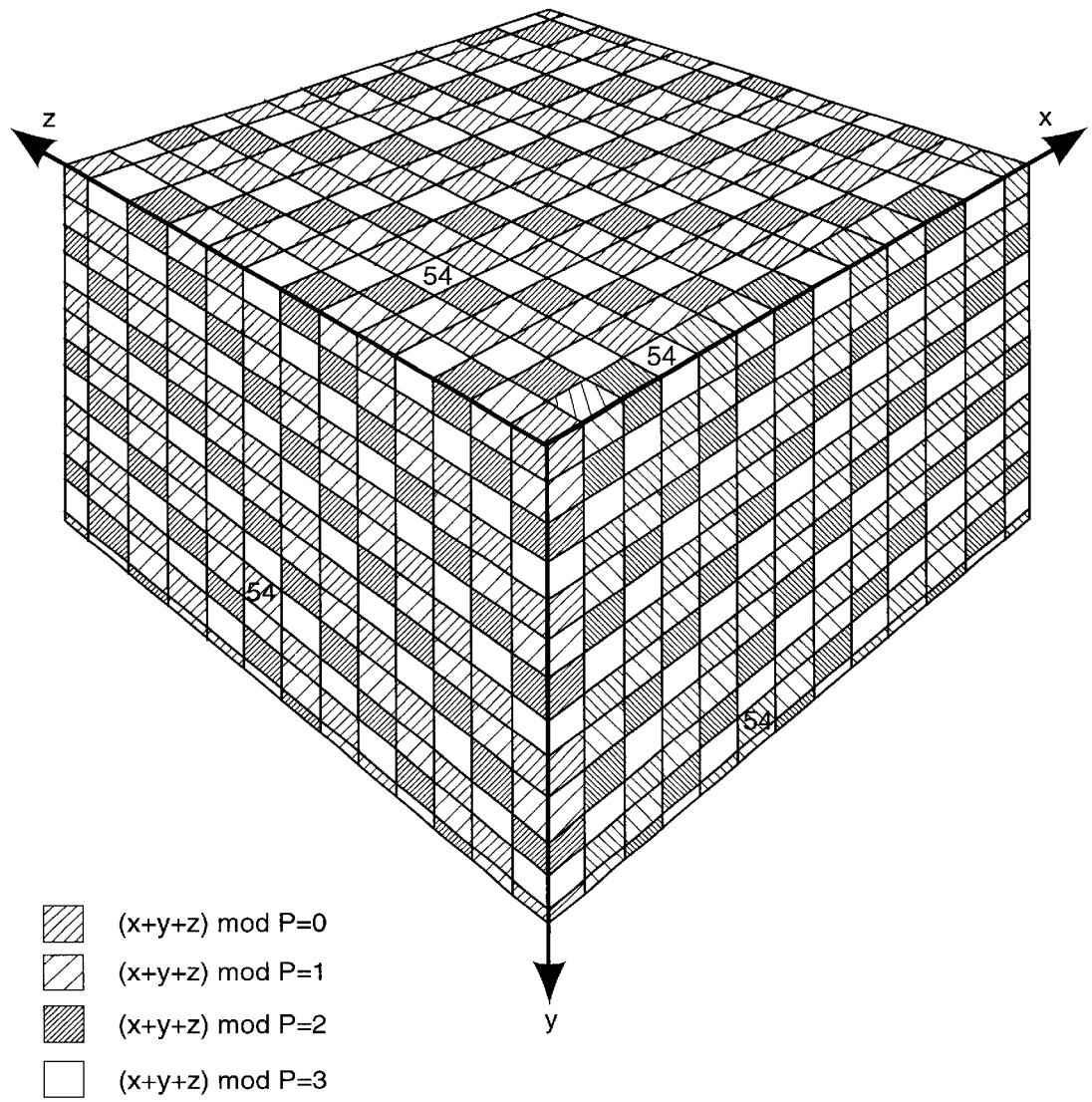
FIG. 4 is a diagrammatic illustration the skewing of voxels among memory modules in the prior art Cube-4 system.

Referring now to FIG. 4, the problem of requiring three copies of a volume data set is solved in the Cube-4 system by "skewing" the volume data set across memory modules in all three dimensions simultaneously. That is, adjacent voxels are stored in adjacent memory modules, so that no matter which way rays enter the volume data set, adjacent rays pass near adjacent voxels assigned to different memory modules. FIG. 4 illustrates this skewing by showing the detail of a portion of a volume data set near one corner, for a system with four memory modules. Each voxel in the figure is illustrated by a small cube 54, and the patterns on the cubes depict the assignment of voxels to memory modules. As can be seen from the illustration, adjacent voxels on the three visible faces of the volume data set have different shaded patterns and therefore are assigned to different memory modules. It will be appreciated that the same is true for the three faces of the volume data set that are not shown in FIG. 4, that is, the three back faces. In the terminology of the Cube-4 system, this arrangement is called "skewing" and it is the essence of the Cube-4 invention.

The arrangement of voxels among memory modules can be described mathematically. If there are P memory modules and processing units, then a voxel located at position (x, y, z) within the volume data set is assigned to the memory module numbered $$(x+y+z) \bmod P, \qquad (1)$$

where x, y, and z are integers that represent the position of the voxel within the data set in terms of the three dimensions, and where the symbol "mod" represents the mathematical operation of dividing the quantity on the left by the integer on the right and keeping only the remainder. That is, the memory module number can be obtained via Formula 1 by adding up the three positional coordinates of the voxel, dividing by the number of memory modules P, and taking the remainder, this remainder having values ranging from zero to (P−1). Although the x, y, and z coordinates of a voxel are typically counted from a designated corner of the data set, it is also possible, without loss of generality, to count from some designated point, this point being referred to as the "origin."

It will be appreciated from Formula 1 that the voxels of every slice through each of the three dimensions of the volume data set are skewed across memory modules in exactly the same way, but starting with a different memory module. Therefore, if one of the slices were peeled away from any face of the volume data set of FIG. 4, it would reveal an identically colored or shaded slice immediately behind it, but with the patterns shifted by one voxel. Moreover, it will be appreciated that voxels of a particular memory module are always bracketed by voxels of the same two other modules, one module on one side and one on the other. Thus, a particular processing unit associated with a memory module has exactly two neighbors.

This organization has a profound effect on the ability to parallelize the casting of rays. A group of P rays can be cast in any direction through any face of the volume data set, with each ray being assigned to one processing unit, and they can always be processed in parallel without memory conflicts. Each processing unit fetches a voxel near its ray from its own memory module, so that P adjacent voxels are fetch simultaneously and concurrently. Thus, the skewed memory organization enables full parallelism in rendering a volume data set from any view direction.

Figure 5:
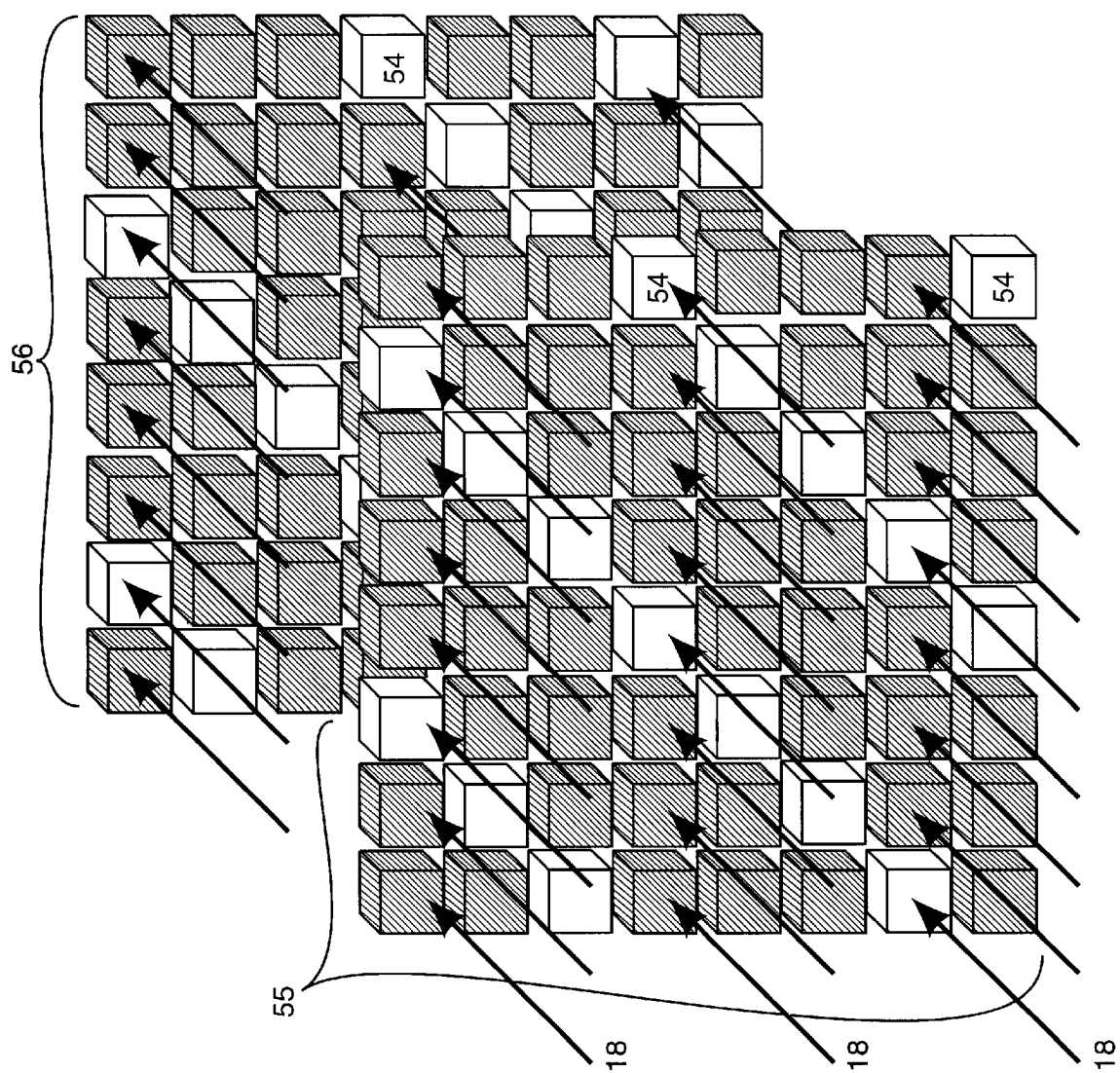
FIG. 5 is a diagrammatic illustration slice parallel rendering as implemented in a Cube-4 system.
Figure 6:
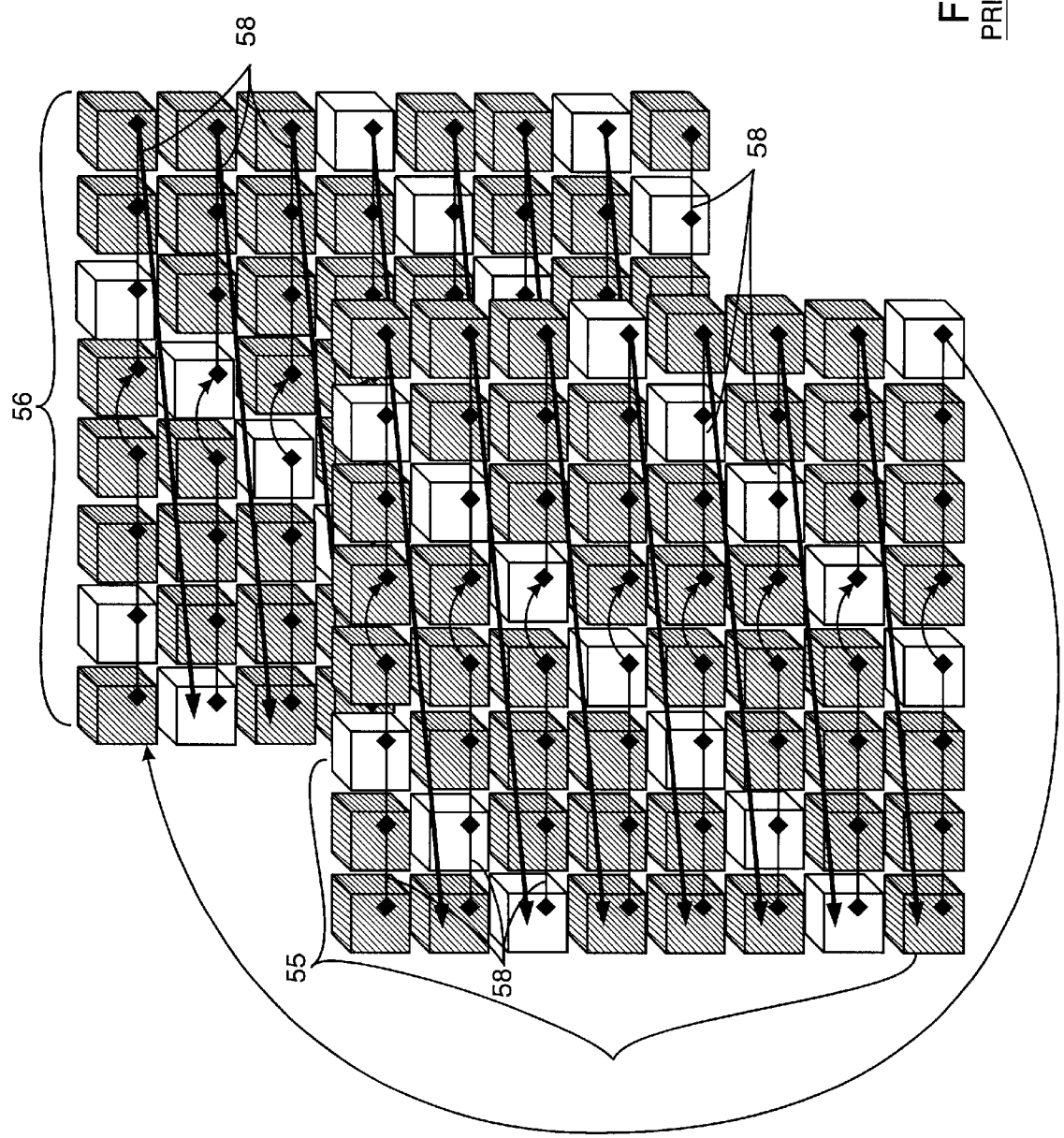
FIG. 6 is a diagrammatic illustration the order of fetching and processing voxels from two consecutive slices in a Cube-4 system.

Referring now to FIGS. 5 and 6, the Cube-4 system renders a volume data set a slice at a time, casting all rays through that slice and accumulating the visual characteristics of all sample points within the slice, before proceeding to the next slice. This technique is called "slice parallel" rendering. FIG. 5 is a diagrammatic illustration depicting a multiplicity of rays 18 entering the face of a slice 55 of the volume data set. It will be appreciated that in actual practice, there are far more rays than can be illustrated in this simple figure.

In the slice parallel technique, each ray 18 entering slice 55 is partially rendered. That is, the visual characteristics including color, brightness, and transparency of each ray is assigned so far as possible from the data available in slice 55.

Only after all of the rays have accumulated visual characteristics from slice 55 does the Cube-4 system peel away that slice and step forward to the next slice 56. Because of the skewing of voxels across memory, slice 56 is identical to slice 55, but with its memory module assignments shifted by one voxel.

FIG. 6 is an illustration of the actual order of fetching voxels in the Cube-4 system. In this illustration, P is assumed to be four, so there are four memory modules and four processing pipelines. Voxels 54 are fetched from the top row of the slice in groups 58 of P voxels, starting in the upper left corner. Once these P voxels are inserted into the processing pipeline, the next P voxels from the same row are fetched, then the next, etc., until the row is completed. Then the system steps down to the next row, also fetching in groups of P voxels until that row is also completed. This processing is repeated for all rows of slice 55 until that slice is completed. Then processing continues with the next slice 56, also in groups of P voxels starting from its upper left corner.

It will be appreciated that variations of the Cube-4 algorithm are possible in which processing begins with some other corner or some other designated point, but it always proceeds in groups of P voxels at a time through the beams of a slice and through the slices of a volume data set.

Figure 7:
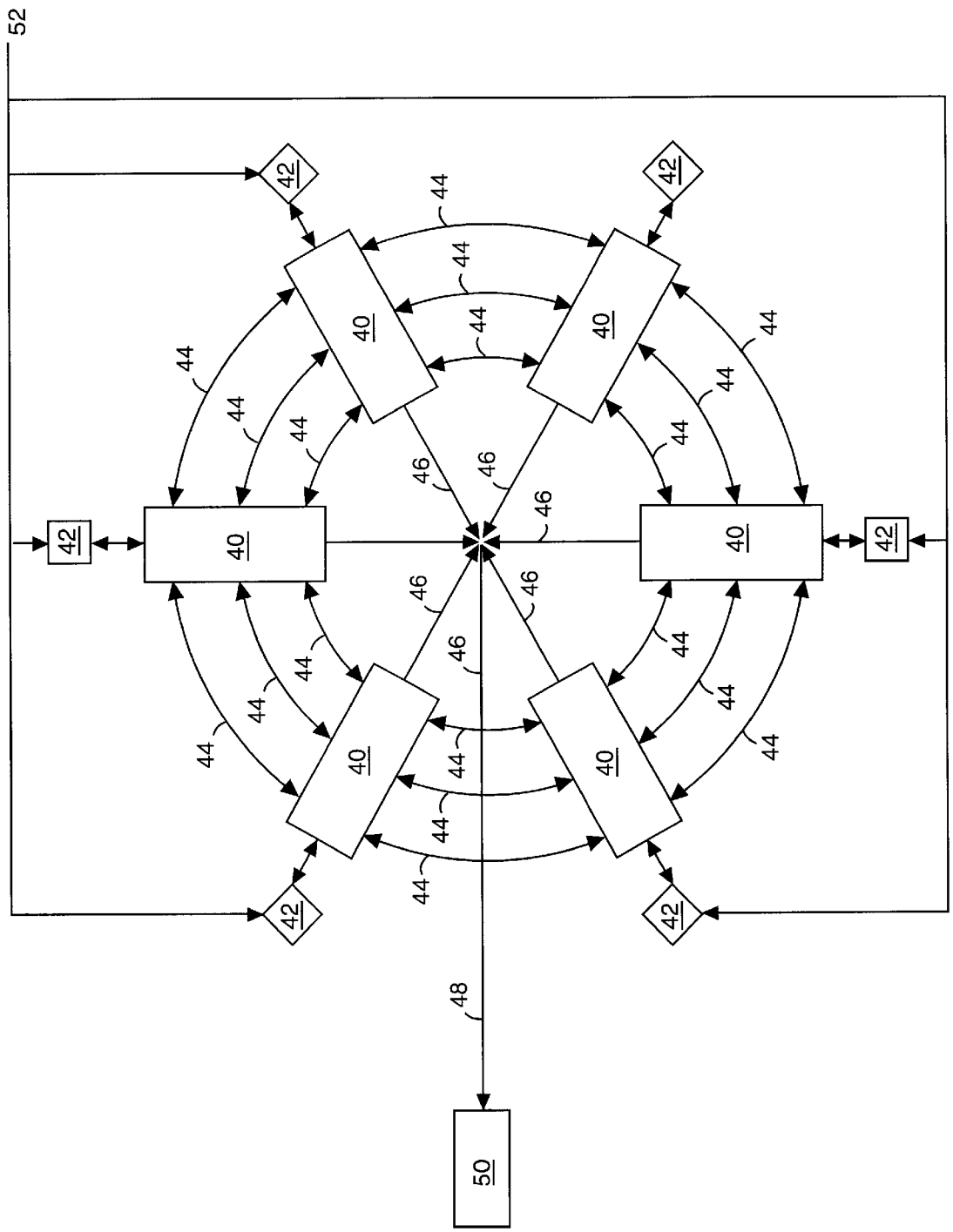
FIG. 7 is a block diagram of a Cube-4 system, showing the connection of processing units in a ring.

FIG. 7 is an idealized block diagram of the prior art Cube-4 system and illustrates the interconnection of the processing elements and memory modules. In FIG. 7, a multiplicity of processing pipelines 40 are each coupled to their own volume memory modules 42. Processing pipelines 40 are coupled to each other via a multiplicity of communication channels 44, each communication channel providing a means for transmitting data in either direction between two processing pipelines. The outputs 46 of the processing elements are coupled to a bus or other mechanism 48 for purpose of conveying pixels of the rendered image to a display play surface 50, such as a computer screen. Input voxels are written to volume memory modules 42 via an input bus 52 which is coupled to each module.

It will be appreciated from FIG. 7 that there is no "first" or "master" processing pipeline. All pipelines have equal status and operate in lock step with each other.

Figure 8:
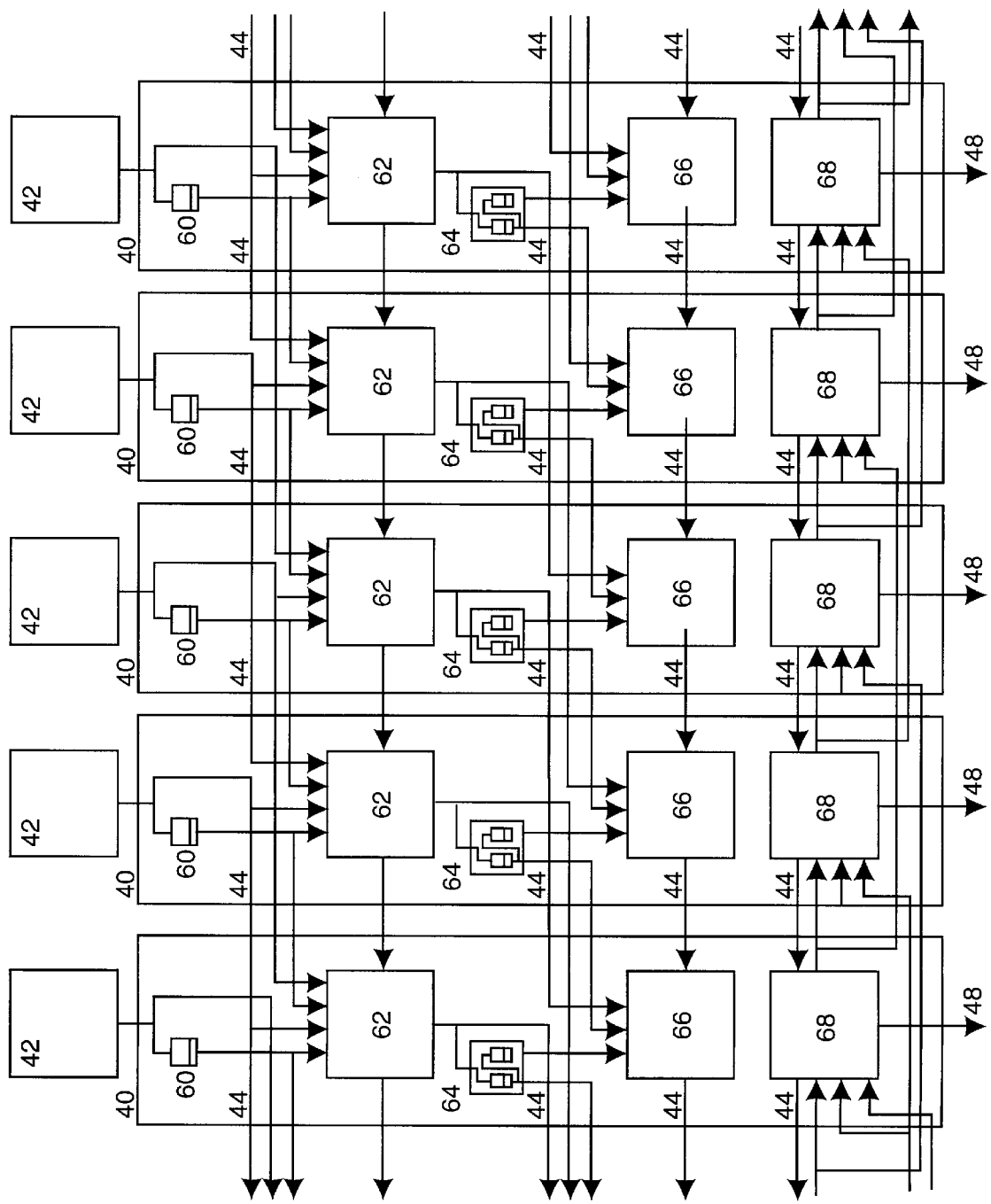
FIG. 8 is a block diagram of the processing pipeline of a Cube-4 system, showing the principal components of the pipeline.

FIG. 8 depicts a block diagram of internal elements of Cube-4 processing pipeline, along with a more detailed view of the communication channels between the pipelines. In the figure are five processing pipelines 40 arranged side-by-side for illustration purposes only. That is, the rightmost processing unit in the figure is connected to the leftmost processing unit so that the entire system form a ring of processing units as in FIG 7. In FIG. 8, each memory module 42 is coupled to FIFO storage unit 60 and to trilinear interpolation unit 62 of its own pipeline. Memory module 42 is coupled via communication lines 44 to the trilinear interpolation units 62 of the two neighboring pipelines to the left and to one trilinear interpolation unit 62 of the neighboring pipeline to the right. FIFO storage unit 60 is coupled to one trilinear interpolation unit 62 in its own processing pipeline and via communication lines 44 to one trilinear interpolation unit 62 in the neighboring processing pipeline to the left and to trilinear interpolation units 62 in each of the two neighboring pipelines to the right. By these connections, each processing pipeline can synthesize sample points 20 from the eight surround voxels. FIFO storage units 60 are First-in, First-out storage circuits that provide internal storage necessary to hold copies of voxel values from one beam to the next and one slice to the next.

Trilinear interpolation unit 62 is coupled both to FIFO storage unit 64 and to shader unit 66. FIFO storage unit 64 is coupled to shader unit 66 of its own pipeline and, via communication lines 44, to shader units 66 of the two neighboring pipelines to the right. Shader unit 66 of a pipeline is also coupled via communication lines 44 to shader units 66 of the nearest neighboring pipelines on either side and also to the shader unit 66 of the second neighboring pipeline to the right.

The output of shader unit 66 is coupled to compositing unit 68, which is also couple via communication lines 44 to compositing units 68 of the neighboring pipeline to the left and to the three neighboring pipelines to the right.

Detailed operation of the Cube-4 system, along with the descriptions of the signals passing across communication lines 44 is given in the aforementioned Doctoral Dissertation by Hanspeter Pfister and also in a Master's thesis (i.e., "Diplomarbeit im Fach Informatik") by Urs Kanus and Michael Meissner entitled "Cube-4, a Volume Rendering Architecture for Real-time Visualization of High-resolution Volumetric Datasets," submitted to Eberhard-Karls-Universität Tübingen, in Tübingen, Germany, on Sep. 30, 1996. In general, P voxels are fetched from memory modules 42 and forwarded to a multiplicity of trilinear interpolation units 62 to synthesize samples 20. Since each sample is synthesized from the eight voxels surrounding it, and since these voxels reside in adjacent rows and adjacent slices, it will be appreciated that some voxel values must be "held up" or delayed to wait for others to be fetched. This delay is provided by FIFO storage units 60. Once samples 20 have been synthesized, they are forwarded to shader units 66 where gradients are calculated.

Each gradient depends upon the values of samples on either side of it and on samples above and below it and on samples in front of and behind it. It will be appreciated that some samples are computed before others, so the earlier sample values must be held up or delayed, just like voxel values. FIFO storage units 64 provide two levels of delay, one level for a single slice and one level for a second slice.

Finally, after gradients are calculated, the color, brightness, and transparency of the samples can be calculated. These visual characteristics are forwarded to compositing units 68 where they are combined with the colors, levels of brightness, and transparencies already accumulated in their respective rays for previously processed voxels and samples. It will be appreciated that a ray may pass through the volume data set at an angle, so that when it emerges from a slice in the vicinity of a voxel, it may enter the next slice in the vicinity of any of nine voxels. These nine voxels are skewed across as many as five memory modules. Therefore, the values of partially accumulated rays must be forwarded to any of five processing pipelines 40 and the compositing units 68, depending upon the view direction, for continued accumulation of color, brightness, and transparency values of additional slices.

When a ray is finally completed, it is forwarded to the viewing surface via pixel bus 48 for display.

c) Limitations Memory Access Rates in Cube-4

Looking in more detail at the assignment of voxels to memory modules, it is possible to see the order in which voxel values are fetched from memory during slice parallel processing. If a volume data set is organized as a cube with N voxels on each edge so that it has a total of $N^3$ voxels, and if N is evenly divisible by P, then the address of each voxel within its memory module in the Cube-4 system is given by the mathematical formula $$\lfloor \frac{x}{P} \rfloor + y \times \frac{N}{P} + z \times \frac{N^2}{P}, \quad (2)$$

where x, y, and z are the integer coordinates of the voxel with respect to a corner or some other origin of the volume data set and where the symbol $$\lfloor \frac{x}{P} \rfloor$$

denotes the result of dividing the integer x by the number P and discarding the remainder.

Figure 9:
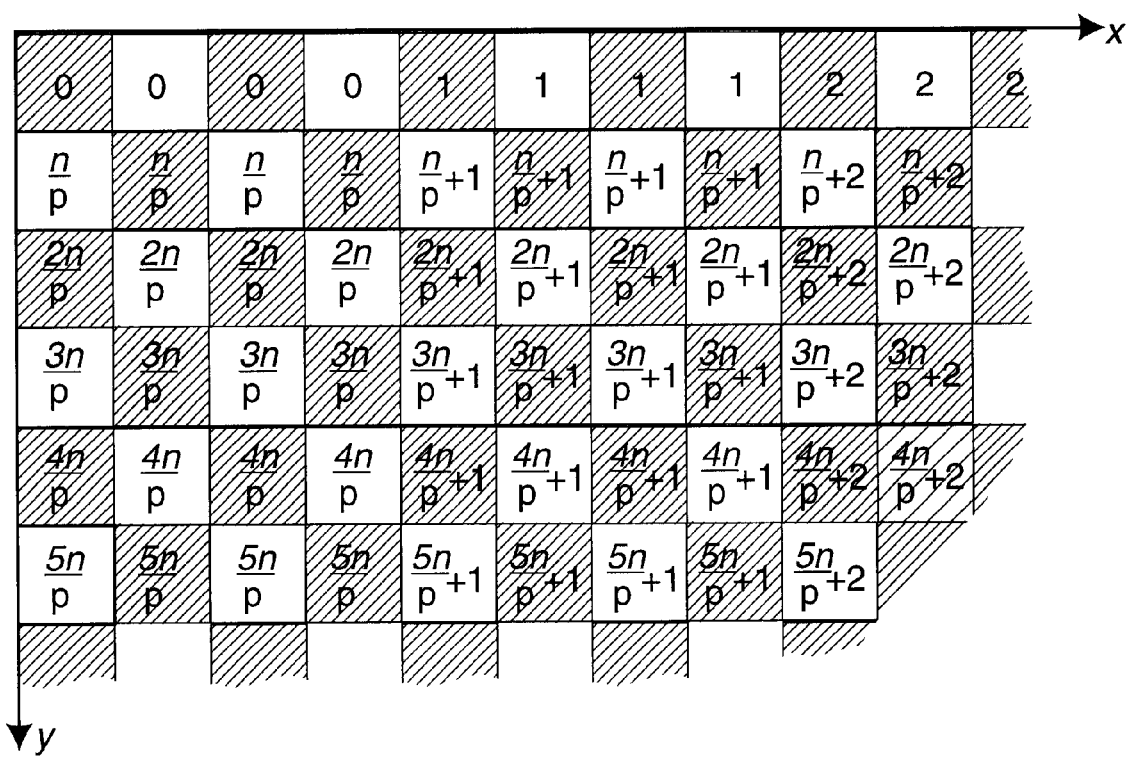
FIG. 9 is a diagrammatic illustration the memory addresses of voxels on the XY face of a volume data set in the Cube-4 system.

FIG. 9 illustrates the shading of voxels on the XY face of FIG. 4, along with the memory address of each voxel for P equal to four. It will be appreciated from the figure that within any row, groups of P adjacent voxels have the same memory address within their respective memory modules. Moreover, when a processing unit fetches voxels consecutively according to the Cube-4 algorithm, it fetches successive voxels of the same shading from the same row. It can be seen from FIG. 9 that these voxels have consecutive memory addresses within their memory modules. More generally, it will be appreciated from Formula 2 that for any slice of the volume data set parallel to the XY face, consecutive voxels have consecutive memory addresses. In theory, it would possible to use a burst mode DRAM module to fetch these voxels more quickly, provided the view direction was such that rays enter the XY face of the volume.

Figure 10:
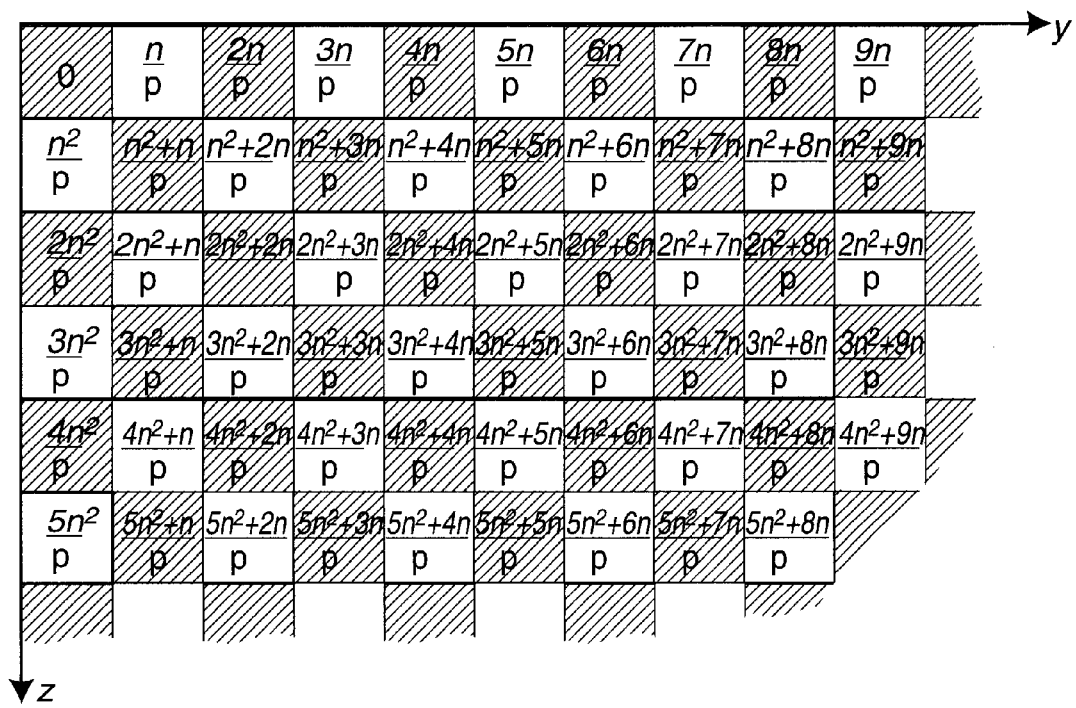
FIG. 10 is a diagrammatic illustration the memory addresses of voxels on the YZ face of a volume data set in the Cube-4 system.

However, FIG. 10 illustrates the assignment of memory addresses to voxels on the YZ face of the same volume data set with P equals four. On this face, it can be seen from the figure that consecutive voxels having the same shading within the same row differ in their memory addresses by the amount N. Moreover, the last voxel of a row having a given shading and the first voxel of the next row having the same shading differ in their memory addresses by the amount 3×N÷4. Therefore, it would not be possible to use burst mode of a DRAM module to fetch consecutive voxels for rays entering the YZ face. A processing unit fetching voxels according to the Cube-4 algorithm would be limited to fetching them in ordinary mode, that is, not in burst mode, at a data rate as slow as if it were fetching memory locations at random.

It will be appreciated from Formula 2 that in the ZX face consecutive voxels of any row having the same shading would differ in their memory addresses by $N^2$. Therefore, burst mode could not be applied to processing rays entering this face, either.

More generally, if the volume data set is a rectangular solid with dimensions L, M, and N, where each of L, M, and N is evenly divisible by P, then it has a total of L×M×N voxels. The address of each voxel in the Cube-4 system is given by the formula $$\lfloor \frac{x}{P} \rfloor + y \times \frac{L}{P} + z \times \frac{L \times M}{P}. \quad (3)$$

It will be appreciated from Formulas 1 and 3 that consecutive voxels within a row having the same shading on the XY face are stored at consecutive memory addresses, but consecutive voxels within a row having the same shading on the YZ face are stored at addresses differing by L and that consecutive voxels within a row having the same shading on the ZX face are stored at addresses differing by L×M. Thus, burst mode can be used to speed up the fetching of voxels when rays enter the XY face, but it cannot be used when they enter the YZ or ZX faces.

d) Blocking and the Utilization of Burst-mode DRAM

Figure 11:
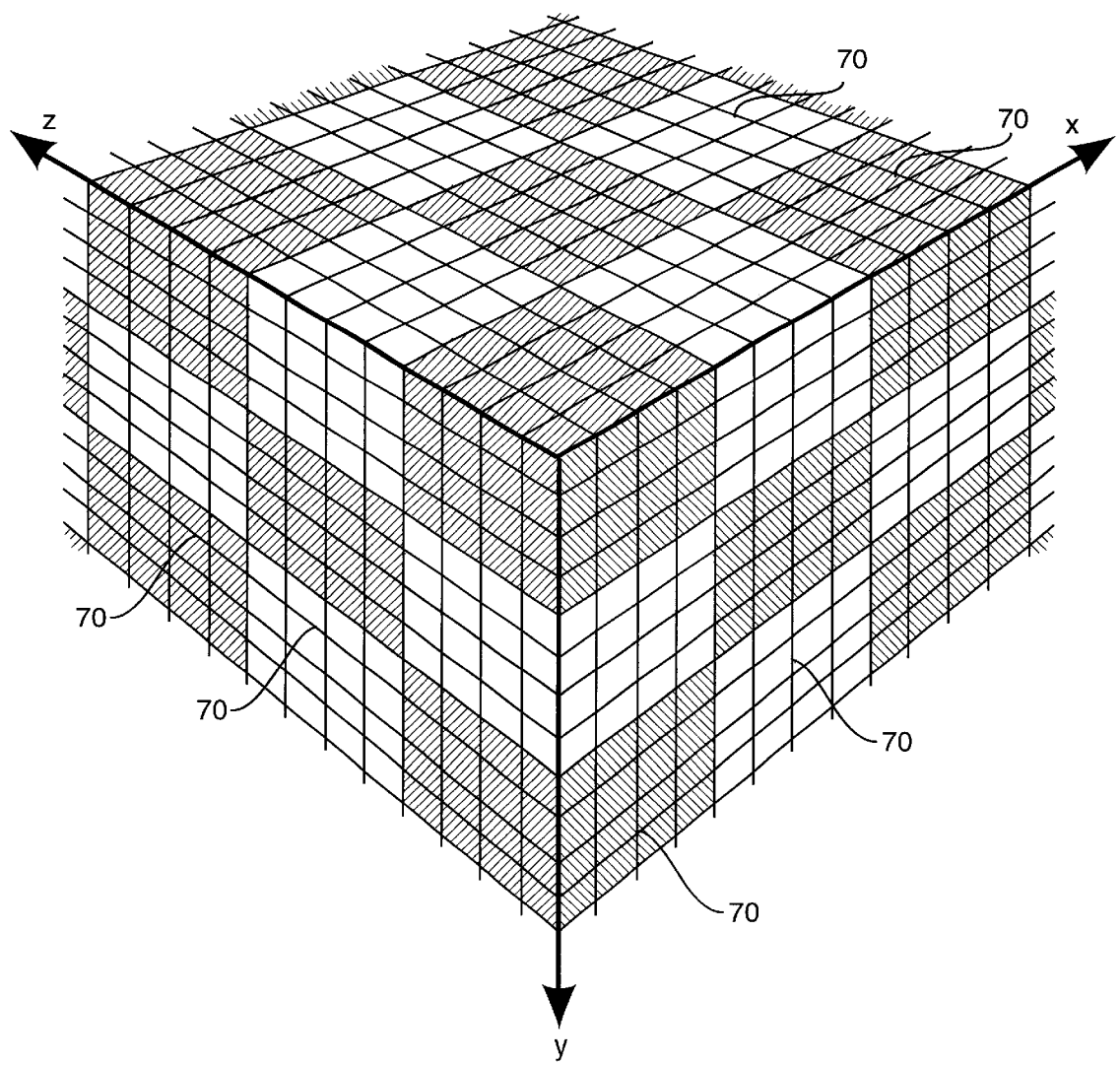
FIG. 11 is a diagrammatic illustration the organization of voxels by blocks and the skewing of blocks among memory modules in the subject invention.

Referring now to FIG. 11, in order to group voxels in such a way that they can be fetched from consecutive memory addresses, regardless of viewing direction, the subject invention utilizes a technique called blocking. By doing so, it becomes possible to use burst mode to access voxels from DRAM modules for all viewing directions. In this technique, voxels are organized into sub-cubes or blocks 70, and blocks are skewed across memory modules rather than individual voxels being skewed. The shading of a block in the figure indicates the memory module in which it is stored, with all of the voxels of that block being stored in that same memory module.

In particular, if each block has B voxels along each of its edges, then the assignment of a voxel with coordinates (x, y, z) is given by the formula $$(\lfloor \frac{x}{B} \rfloor + \lfloor \frac{y}{B} \rfloor + \lfloor \frac{z}{B} \rfloor) \bmod P, \quad (4)$$

where P is the number of memory modules and processing units and x, y, and z are integer coordinates of the voxel relative to the corner or other origin of the volume data set in each of the three dimensions. That is, the memory module to which voxel (x, y, z) is assigned can be determined by dividing each coordinate by B, throwing away the remainder, taking the sum of these three divisions, then dividing the resulting sum by P and taking the remainder. This is the same formula described by Lichtermann in the aforementioned description of the $DIV^{2A}$ system.

Blocks are numbered within the volume data set in the subject invention in the same way as voxels are numbered in the Cube-4 system, that is by counting blocks in each of the three dimensions from the corner or other origin. It will be appreciated from Formula 4 that a voxel at position (x, y, z) is stored in a block with block coordinates ($B_x$, $B_y$, $B_z$) given by the formulas $$B_x = \lfloor \frac{x}{B} \rfloor, B_y = \lfloor \frac{y}{B} \rfloor, B_z = \lfloor \frac{z}{B} \rfloor, \quad (5)$$

If the volume data set represents a cube with $N^3$ voxels, and if P×B evenly divides N, the number of voxels on a side of the cubic data set, then the starting address of the block with coordinates ($B_x$, $B_y$, $B_z$) within its memory module is given by the formula $$\frac{B_x \times B^3 + B_y \times N \times B^2 + B_z \times N^2 \times B}{P} \quad (6)$$

Within each block, the voxels are stored at consecutive memory addresses. It will be appreciated that many possible arrangements of voxels within a block are possible. In one embodiment, voxel memory addresses relative to the beginning of the block are given by the formula $$x\bmod B + B*(y\bmod B) + B^2*(z\bmod B). \quad (7)$$

That is, the position of voxel (x, y, z) within its block can be found by taking the remainders from x, y, and z after dividing by B, then adding the remainder from x to B times the remainder from y and then adding that to $B^2$ times the remainder from z. It will be appreciated that Formula 7 describes consecutive locations with a range of $B^3$ memory addresses, where $B^3$ is the number of voxels in a block.

Figure 12:
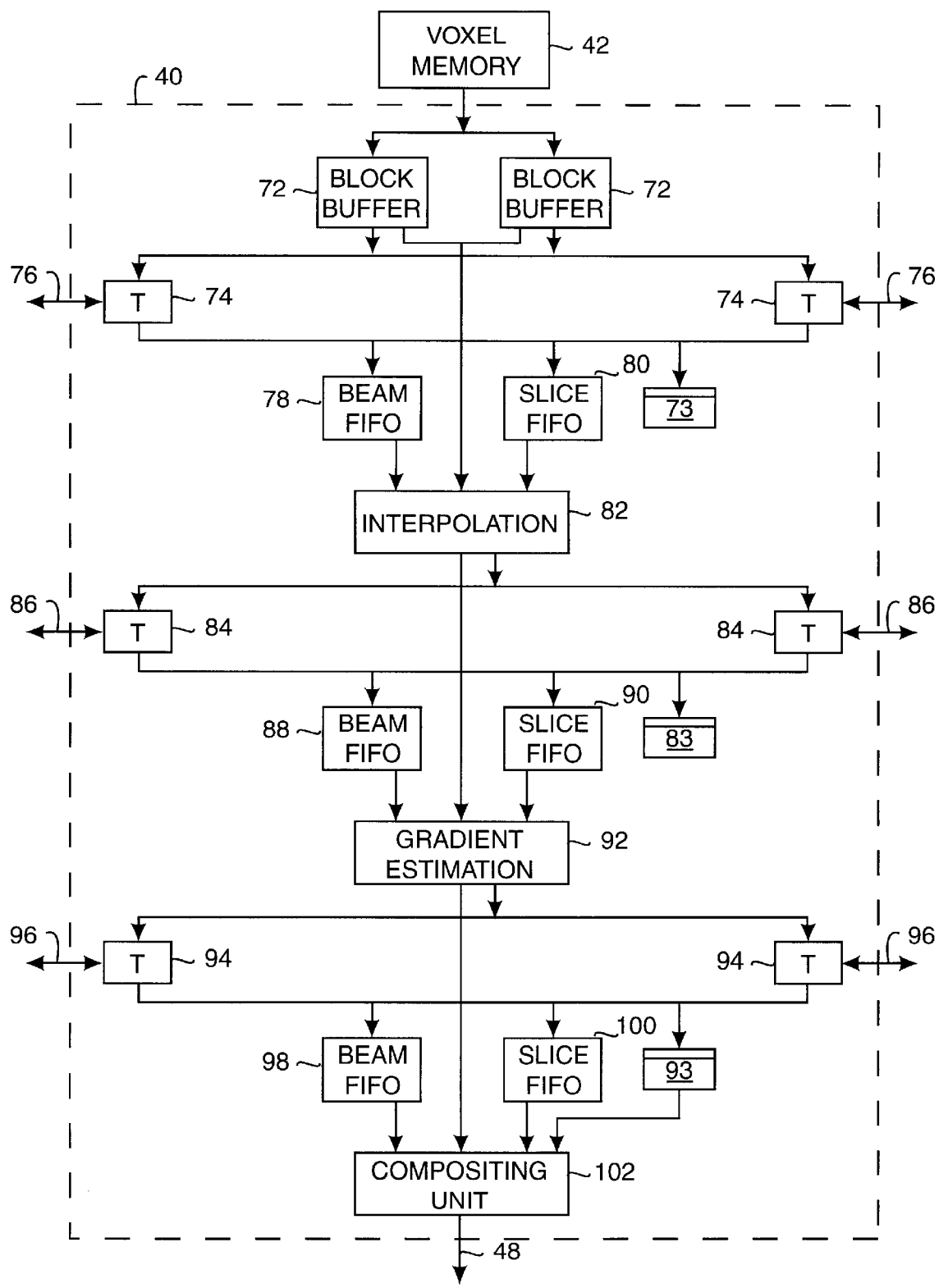
FIG. 12 is a block diagram of a processing pipeline and its associated memory module in one embodiment of the subject invention.

Referring now to FIG. 12, a diagrammatic illustration is of the pipeline processor 40 of one embodiment of the subject invention along with its associated memory module 42. Like Cube-4, the subject invention comprises a multiplicity of processing pipelines 40 and memory modules 42 connected in a ring, as illustrated in FIG. 7. Referring again to FIG. 12, memory module 42 is coupled to two block buffers 72, each of which has capacity to store $B^3$ voxels, where B is the number of voxels on the edge of a block. Each block buffer 72 is coupled both to interpolation unit 82 and to two tri-state interfaces 74. Each tri-state interface 74 is coupled to a voxel communication line 76, one being coupled to the nearest neighboring pipeline 40 in the clockwise direction around the ring and the other being coupled to the nearest neighboring pipeline in the counterclockwise direction around the ring.

It will be appreciated that in electronic design, a tristate interface is one which serves as either an input or output interface. In particular, in a semiconductor implementation of the present embodiment, the pins connecting tri-state interface 74 to communication line 76 are both input and output pins. Therefore, each voxel communication line 76 can carry data in either direction, so that processing pipeline 40 can either receive data from or transmit data to either of its nearest neighbors. In this embodiment, both voxel communication lines 76 carry data in the same direction around the ring, that is, either both are configured for clockwise signaling or both are configured for counterclockwise signaling at any given instant.

Tri-state interfaces 74 are also coupled to beam FIFO storage unit 78, to slice FIFO storage unit 80 and to optional delay unit 73. Beam FIFO storage unit 78, slice FIFO storage unit 80, and optional delay unit 73 are all coupled to interpolation unit 82. For rendering a volume data set L voxels wide, M voxels high, and N voxels deep, beam FIFO storage unit 78 is configured to hold L÷(B×P) elements, where each element is an array of $(B+1)^2$ voxels. Likewise, slice FIFO storage unit 80 is configured to hold (L×M)÷(B²×P) elements, where each element is an array of an array of B×(B+1) samples. Optional delay unit 73 is configured to hold $B^2$ voxels and to delay them either zero fundamental cycles or $B^3$ fundamental cycles, depending upon whether the pipeline is at the left end of its partial beam or not. As will be shown below, beam and slice FIFO storage units 78 and 80 hold voxels forwarded from immediately above and in front of the block being processed, respectively. Optional delay unit 73 holds voxels forwarded from the pipeline immediately to the left.

Interpolation unit 82 calculates the values of sample points based on the immediately surrounding voxels. In general, to calculate $B^3$ sample points, $(B+1)^3$ voxel values are needed. These are obtained from the $B^3$ voxels read from voxel memory 42 into block buffer 72, plus an array of $B^2$ voxels from optional delay unit 73, an array of $(B+1)^2$ voxels from beam FIFO storage unit 78, and an array of B×(B+1) voxels from slice FIFO storage unit 80.

Interpolation unit 82 is coupled to gradient estimation and shading unit 92 and to tri-state interfaces 84. Tri-state interfaces 84 are coupled to sample communication lines 86, which are in turn coupled to the nearest neighbor pipelines in the clockwise and counterclockwise directions, respectively. Like voxel communication lines 76, sample communication lines 86 are bi-directional and may carry sample data in either direction around the ring. Tri-state interfaces 84 are also coupled to beam FIFO storage unit 88, slice FIFO storage unit 90, and optional delay unit 83. Optional delay unit 83 and beam and slice FIFO storage units 88 and 90 are all coupled to gradient estimation and shading unit 92.

For rendering a volume data set L voxels wide, M voxels high, and N voxels deep, beam FIFO storage unit 88 is configured to hold L÷(B×P) elements, where each element is an array of $2\times(B+2)^2$ samples. Likewise, slice FIFO storage unit 90 is configured to hold (L×M)÷(B²×P) elements, where each element is an array of 2×B×(B+2) samples. Optional delay unit 83 is configured to hold $B^2$ sample values for a delay of either zero fundamental cycles or $B^3$ fundamental cycles, depending upon whether the pipeline is at the left end of its partial beam or not. As will be shown below, beam and slice FIFO storage units 88 and 90 hold samples forwarded from immediately above and in front of the block being processed, respectively. Optional delay unit 83 holds samples forwarded from the pipeline immediately to the left.

Gradient estimation and shading unit 92 is coupled directly to compositing unit 102. Compositing unit 102 is coupled to tri-state interfaces 94, which in turn are coupled to composition element communication lines 96. As with voxel communication lines 76 and sample communication lines 86, composition element communication lines 96 are bi-directional communication lines to the nearest neighboring pipeline in each of the clockwise and counterclockwise direction around the ring. Tri-state interfaces 94 are also coupled to beam FIFO storage unit 98, slice FIFO storage unit 100, and optional delay unit 93. Beam FIFO storage unit 98, slice FIFO storage unit 100, and optional delay unit 93 are all coupled to compositing unit 102. Finally, compositing unit 102 is coupled to pixel output bus 48, which is in turn coupled to a viewing surface such as a computer screen.

For rendering a volume data set L voxels wide, M voxels high, and N voxels deep, beam FIFO storage unit 98 is configured to hold L÷(B×P) elements, where each element is an array of $(B+1)^2$ pixel values of partially accumulated rays, that is, visual characteristics containing color, opacity, and depth information. Likewise, slice FIFO storage unit 100 is configured to hold (L×M)÷(B²×P) elements, where each element is an array of B×(B+1) pixel values of partially accumulated rays. Optional delay unit is configured to hold B pixel values of partially accumulated rays with a delay of either zero fundamental cycles or $B^2$ fundamental cycles. As will be shown below, beam and slice FIFO storage units 98 and 100 hold pixel values of partially accumulated rays forwarded from immediately above and in front of the block being processed, respectively. Optional delay unit 93 holds pixel values of partially accumulated rays from the pipeline immediately to the left.

In other words, in the present embodiment of the subject invention, a processing unit 40 comprises four major functional stages connected together in pipeline fashion, namely, a block buffering stages, an interpolation stage, a gradient estimation and shading stage, and a compositing stage. Each stage is separated from the next by a pair of bi-directional communication lines to the neighboring pipelines and by beam and slice FIFO storage units capable of holding values forwarded from the previous beam and the previous slice.

e) Method of Operation

Figure 13:
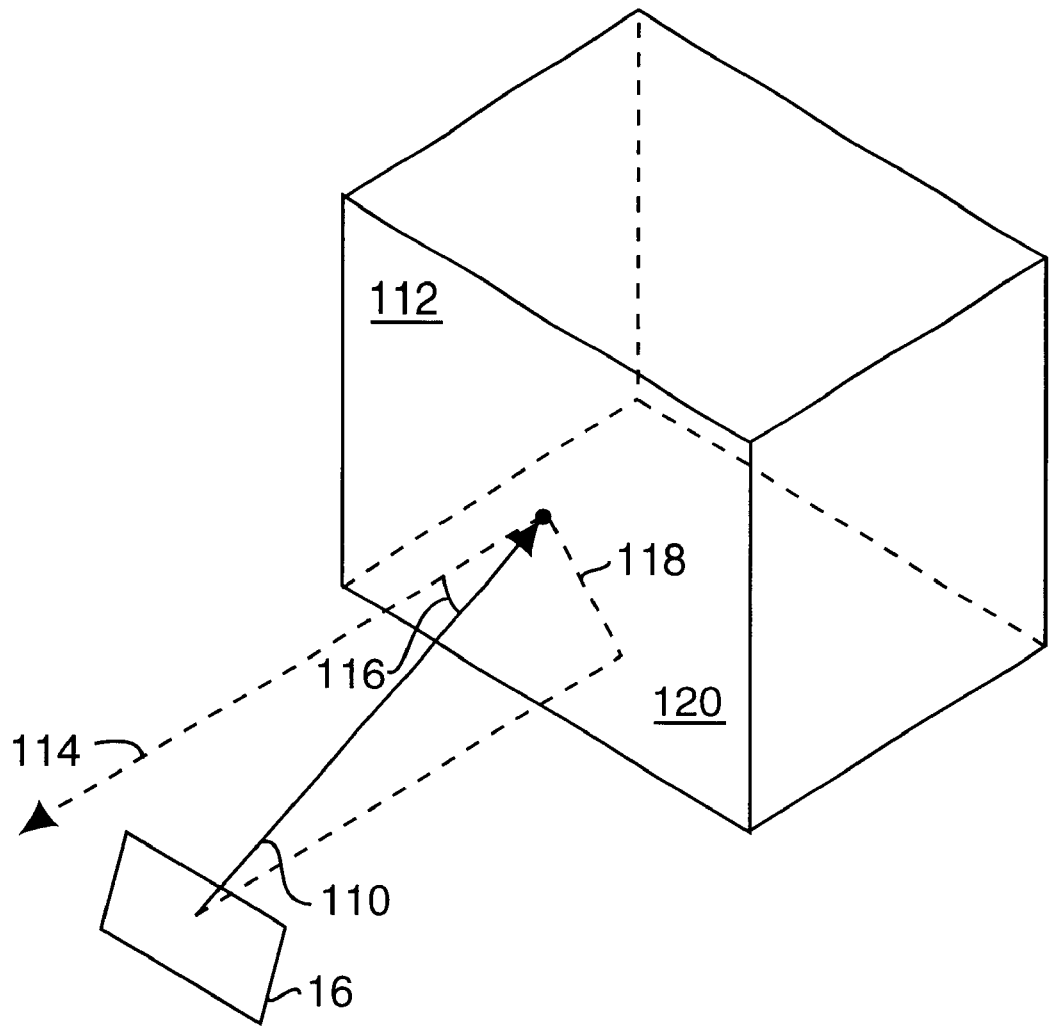
FIG. 13 is a diagrammatic illustration the determination of the rendering coordinates and the selected "front" face for rendering, based on the angle of a ray from the viewing surface.

The method of operation of this embodiment of the subject invention will now be described. Referring to FIG. 13, the view direction is determined. A single ray 110 is cast perpendicularly from the view surface through the volume data set, that is from image 10, so that it strikes the center of face 112 that is nearest and most nearly perpendicular to the view surface. In general, the ray will strike the view surface at some angle 116 less that 45 degrees from the normal vector of face 112, that is, from a line perpendicular to face 112. It will be appreciated that if the angle 116 is greater than 45 degrees, a different face of the volume data set would be nearer and more nearly perpendicular to the ray 110. If the angle 116 to normal vector line 114 is exactly 45 degrees, then either of two view surfaces can be chosen arbitrarily. Moreover, if ray 110 strikes a corner of the volume data set, then angle 116 will be 45 degrees from each of three normal vectors will be 45 degrees, and any of the three faces can be chosen arbitrarily.

Having selected a face 112, ray 110 is projected onto the face, making a "shadow" 118 of the ray. In general, this shadow will land in one of the four quadrants of the face. The quadrant 120 containing shadow 118 will be the selected quadrant. If shadow 118 lands on a line between two quadrants, then either quadrant can be selected. If shadow 118 is a point exactly in the center of face 112, then ray 110 is perpendicular to the face and any quadrant may be selected.

Having selected a quadrant 120 of a face 112, the volume data set may now be rotated in three dimensions so that face 112 is at the "front" and quadrant 120 is in the upper left corner. It will be appreciated that in "rotating" the volume data set, no data has to be moved. Instead, an appropriate transformation matrix can be applied to voxel and block coordinates to translate these coordinates into coordinate system in which the corner of the selected quadrant is the origin and is in the upper left corner of the front face. The theory of transformation matrices is explained in graphics textbooks, including the aforementioned reference by J. Foley, et al.

In the following discussion, coordinates relative to the volume data set itself are denoted as x, y, and z, while coordinates relative to the selected quadrant 120 are denoted u, v, and w. These are called "rendering coordinates." The terms "left," "right," "above," "below," "back," and "front" are defined in terms in rendering coordinates as follows:

| | |
|---|---|
| "Left" | "in the direction of decreasing values of u." |
| "Right" | "in the direction of increasing values of u." |
| "Above" and "top" | "in the direction of decreasing values of v." |
| "Below" and "bottom" | "in the direction of increasing values of v." |
| "Front" | "in the direction of decreasing values of w." |
| "Back" | "in the direction of increasing values of w." |

Moreover, the front, left, top corner of the volume data set in rendering coordinates is designated as the "origin," that is, the voxel with (u, v, w)=(0, 0, 0). In rendering coordinates, rays always pass through a volume from front to back and in a downward and rightward direction, unless they happen to be perpendicular to the face.

It will be appreciated from the definition of block skewing in Formula 4 that the association of the terms "left," "right," "above," "below," "front," and "back" with particular neighboring pipelines depends upon the viewing direction. For one viewing direction, the pipelines in front, to the left, and above may all be the pipeline in the counterclockwise direction in FIG. 7, while in other viewing directions, some or all of them may be the pipeline in the clockwise direction in FIG. 7.

In the current embodiment of the subject invention, the processing order is exactly that of FIG. 6 except that it references blocks, not individual voxels. That is, processing begins at the origin in rendering coordinates and proceeds from left to the right in groups of P blocks across each beam of blocks, then beam by beam down the slice blocks, and then slice by slice from the front of the volume to the back. As the processing pipelines step across the volume in groups of P blocks, rays will always exit blocks in the direction still to be processed, that is, either to the back, the bottom, or the right. In all cases, already processed data will come from above, to the front, and to the left of a block currently being processed.

Referring again to FIG. 12, the fundamental processing cycle in the current embodiment of the subject invention is the cycle time of reading one voxel from DRAM memory in burst mode. These fundamental cycles are grouped into block cycles of $B^3$ fundamental cycles each. At the beginning of a block cycle, $B^3$ voxels are fetched from consecutive addresses of memory module 42, starting at the beginning of the block under consideration and continuing for $B^3$ fundamental cycles. Voxels are fetched into one of the two block buffers 72. During the next block cycle, those $B^3$ voxels will be processed while a new block of $B^3$ voxels is fetched into the other block buffer 72. Then during the following block cycle, the roles of the two buffers are reversed again, in an application of the familiar technique of "double buffering."

Figure 14:
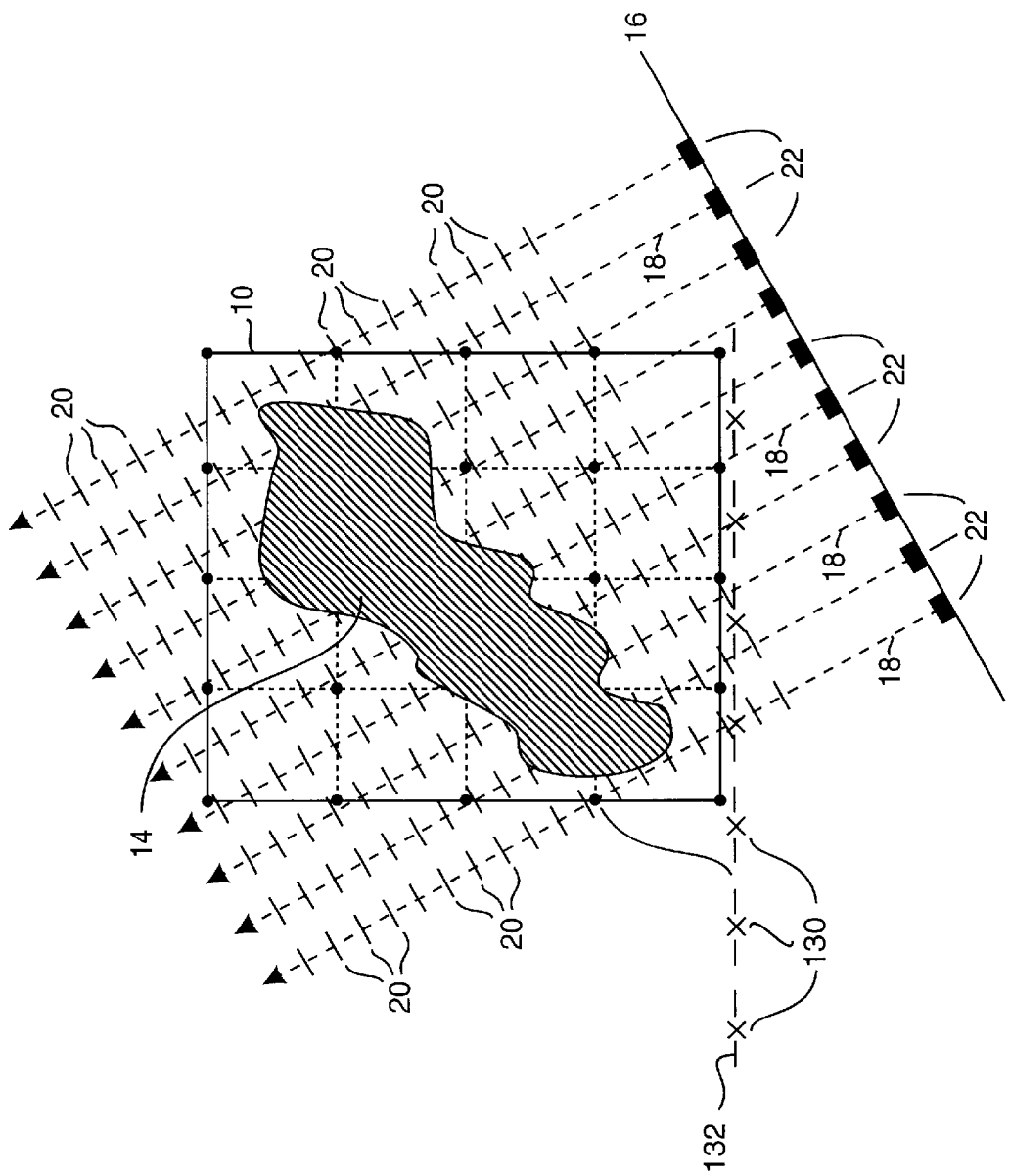
FIG. 14 is a diagrammatic illustration the base plane of a volume data set and its relation to the image plane.

Referring now to FIG. 14, in both Cube-4 and the subject invention, the spacing of rays 18 is determined not by pixels 22 on image plane 16, but by base pixels 130 on the base plane 132. FIG. 14 depicts a two-dimensional illustration of a three-dimensional volume data set and image plane as in FIG. 1. The "base plane" of FIG. 14 is a mathematical plane parallel the selected face 112 of the volume data set and passing through the origin (u, v, w)=(0, 0, 0) in rendering coordinates. "Base pixels" 130 of base plane 132 are coterminous with voxels on face 112, and they extend in all directions with the same spacing as voxels. Rays 18 are cast in a direction perpendicular to image plane 16 but passing through the exact centers of base pixels 130 in base plane 132. The resulting image is then rendered into the base plane, not the image plane. It will be appreciated that, in general, rays passing through base pixels will not line up exactly with pixels 22 of image plane 16. Therefore, a post-processing step is required to "warp" the base plane image into a final image.

It will also be appreciated that for rays 18 that are parallel to each other, sample points are offset in space from their neighboring voxels by the same amount whenever they lie in the same plane parallel to the base plane. This simplifies the Cube-4 algorithm considerably. In particular, it means that adjacent sample points are surrounded by adjacent groups of eight neighboring voxels, with four of those eight being shared between the two sample points.

The flow of data among pipelines during the operation of the current embodiment will now be described. First, an array of $B^3$ sample values along rays 18 is calculated from the $B^3$ voxels of a block plus other voxels forwarded from neighboring pipelines. Since samples are interpolated from their nearest voxels, it will be appreciated that it takes an array of $(B+1)$ voxels to generate $B^3$ samples. Second, an array of $B^3$ gradients is calculated and pixel values representing colors, brightness or shading levels, and transparency levels are assigned. Since it requires the values of samples on all sides of a given sample in order to estimate its gradient, a total of $(B+2)^3$ samples is needed to generate $B^3$ gradients and pixel values. Finally, the $B^3$ pixel values are composited with previously accumulated pixel values to form partially rendered rays. This also requires an array of $(B+1)^3$ pixel values to accumulate the visual characteristics of the rays passing through a block.

FIG. 15 illustrates three views of a three-dimensional array of $(B+1)^3$ voxels needed by a pipeline to calculate a block of $B^3$ sample points. FIG. 15A represents a cross-section of the array for values of w>0, that is, all voxels except the front face of the array. FIG. 15B represents the right face of the array. FIG. 15C depicts a perspective view of the three dimensional array from a view below, in front of, and to the right of the array.

The voxels of the cubic array in FIG. 15 come from four sources. A block of $B^3$ voxels 140 is fetched from volume memory into block buffer 72. An array of $B^2$ voxels 142 is forwarded from the pipeline on the left of the current block via communication lines 76 and optional delay unit 73. An array of $(B+1)^2$ voxels 144 is taken from the output side of beam FIFO storage unit 78, and an array of $B \times (B+1)$ voxels 146 is taken from the output side of slice FIFO storage unit 80. It will be appreciated that the total of these four groups of voxels is $(B+1)^3$. The array 150 of $B^3$ samples, represented in the figure by crosses, is calculated by trilinear interpolation or some other mathematical function. It will appreciated that, in general, the array 150 of $B^3$ samples calculated by this process is offset to the left, front, and above the array 140 of $B^3$ voxels originally fetched from volume memory 42 via block buffer 72. The amount of the offset is always less than the spacing between voxels, but it may be zero in the case of view directions that are perpendicular to one of the axes of the rendering coordinates.

Since P processing pipelines are operating in parallel, voxel array 142 will, in general, be the right face of the block of $B^3$ voxels currently being processed immediately to the left. Therefore, as voxels of a block are being fetched into a block buffer 72, its rightmost $B^2$ voxels must immediately be forwarded to the processing element on the right and inserted into optional delay unit 73, then forwarded to interpolation unit 82. This forwarding must be completed before the voxels are needed for calculating the sample points 150 at the left most edge of block 140. The exception is when block 140 is the leftmost block of a partial beam. In this case, the block to the left was read during the preceding block cycle, so the array of voxels 142 needs to be delayed by one block cycle, that is, by $B^3$ fundamental cycles. This delay is represented by optional delay unit 73 in FIG. 12. In the case that a pipeline is at the left end of its partial beam, the delay value is set to $B^3$ cycles, but otherwise it is set to zero, meaning no delay at all.

Figure 16:
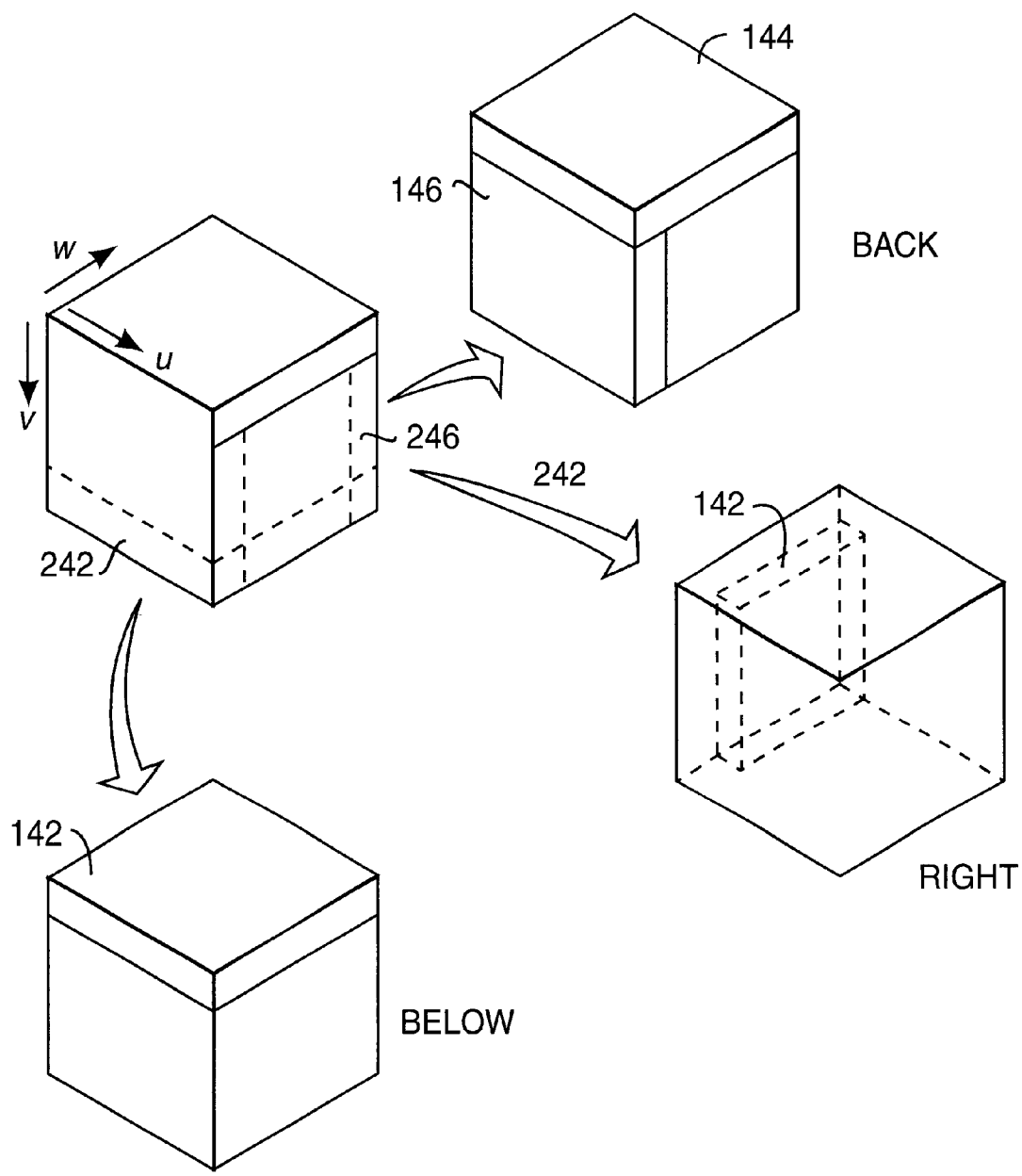
FIG. 16 is a diagrammatic illustration the forwarding of information from a block to support the processing of adjacent blocks in the rightward, downward, and rearward directions.

In addition to forwarding the rightmost face of block 140 for immediate use by the processing pipeline to the right, arrays are also prepared for the processing pipelines below and behind block 140. Referring now to FIG. 16, array 242 mimics array 142. This will be needed during the processing of the next beam, that is, $L \div (B \times P)$ block cycles later. This array is formed from the bottom face of block 140, the bottom row of array 142, and the bottom row of array 146. It is forwarded to the processing pipeline of the block below for storage in its beam FIFO storage unit 78. Likewise, an array 246 mimicking array 146 must be prepared for the processing pipeline of the block behind. This is formed from the back face of block 140 and the back vertical row of array 142. It is forwarded to the slice FIFO storage unit 80 of the processing pipeline of the block behind, to be ready for use one slice later, that is $L \times M \div (B^2 \times P)$ block cycles later.

The calculation of gradients and the compositing of rays follows roughly the same pattern. Interpolation unit 82 produces an array of $B^3$ samples. In general, as illustrated in FIG. 15, these are offset slightly above, to the left of, and in front of the $B^3$ voxels of block 140. In order to calculate $B^3$ gradients from these samples, a cubic array of $(B+2)$ samples is required. This is because each gradient is calculated by taking the central differences or some other mathematical function of the adjacent samples in each of the three dimensions.

Figure 17:
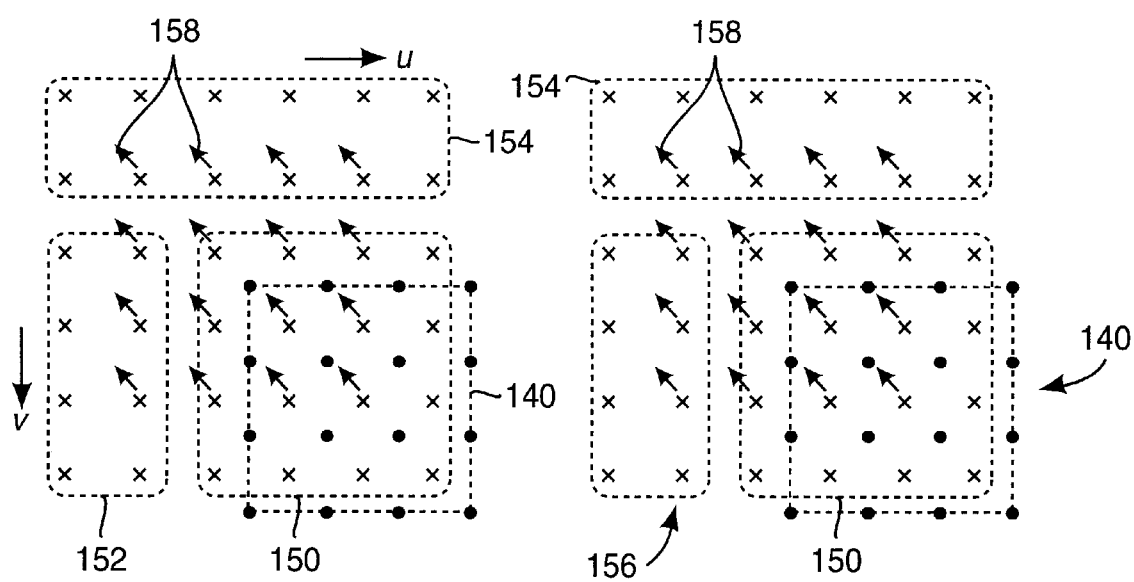
FIG. 17 is a diagrammatic illustration the calculation of gradients from a block of $B^3$ samples and samples forwarded from previously processed blocks.

Referring now to FIG. 17, gradients 158 can be calculated at sample points that are not at the boundary of the $(B+2)^3$ group of samples. The voxels of the original block 140 are illustrated by dots. Samples calculated by interpolation unit 82 are illustrated by crosses. The original group calculated as part of processing block 140 is the $B^3$ array 150 of samples. In addition, an array 152 of $2 \times B^2$ samples is needed from the block immediately to the left, an array 154 of $2 \times (B+2)^2$ samples is needed from the processing of the block above, and an array 156 of $2 \times B \times (B+2)$ samples is needed from the block immediately in front. As with voxel array 142, array 152 is being calculated by the processing pipeline immediately to the left during the same pipeline cycle, unless block 140 is at the left of a partial beam. Therefore, sample array 152 is forwarded to interpolation unit 82 optional delay unit 83. The delay value is set to zero except when the pipeline is at the left end of its partial beam, in which case the delay value is set to $B^3$ fundamental cycles, that is, one block cycle. Arrays 154 and 156, by contrast, are obtained from the beam and slice FIFO storage units 88 and 90, respectively.

Likewise, following the calculation of samples, the interpolation unit 82 must therefore forward arrays mimicking arrays 154 and 156 to the beam and slice FIFO storage units 88 and 90, respectively, for processing in the next beam and slice.

It will be appreciated that the processing pipeline that originally fetched block 140 of voxels calculates gradients on samples that are offset to the left, above, and in front by more than the spacing of one voxel. That is, the it calculates gradients for some of the samples synthesized on earlier block cycles. The reason for this is that no processing unit can calculate a gradient that is dependent upon voxels and samples that are synthesized later. In particular, the processing unit at the right end of a partial beam cannot calculate gradients for the $B^2$ the samples nearest the right face of its block. Moreover, no processing pipeline can calculate gradients for the samples on the bottom face of its block. Therefore, these have to be calculated later, but to compensate, the processing pipeline calculates previously uncalculated gradients for samples above, to the left, and in front of its block.

Following the calculation of gradients, pixel values representing the color, brightness, and transparency or opacity of a sample can be assigned. These are then passed by gradient estimate and shader unit 92 to the final set of stages for compositing. These follow the pattern of FIG. 15, but offset in sample space to the positions of the calculated gradients in FIG. 17. $B^3$ pixel values are forwarded directly from gradient estimation and shading unit 92 to compositing unit 102. An array of pixel values of partially accumulated rays mimicking voxel array 142 is forwarded to the processing pipeline to the right, where it is inserted into optional delay unit 93. Likewise, arrays of compositing elements mimicking voxel arrays 144 and 146 are forwarded to the beam and slice FIFO storage units 98 and 100, respectively, of the neighboring pipelines to the rear and below. As before, these arrays are formed from the bottom and rear slices of the $B^3$ compositing elements calculated from the gradients in the same block cycle, plus the bottom rows of voxels obtained from the left neighbor and from the slice FIFO storage unit 100.

In this way, all of the voxels can be processed in the groups of P blocks at a time, stepping right across a beam of blocks, then stepping beams down a slice of blocks, and stepping slices through the volume data set.

It will be observed that in some embodiments, the processing of each block within a pipeline is carried out in serial fashion in $B^3$ fundamental cycles. When accessing volume memory at burst mode rate of 125 megahertz or 133.3 megahertz, the length of a fundamental cycle is 8 nanoseconds or 7.5 nanoseconds respectively This is very demanding upon the designer of the circuitry that calculates samples, estimates gradients, and composites pixel values in partially accumulated rays. Therefore, in preferred embodiments, processing with a pipeline is carried out in parallel by a multiplicity of processing u nits operating at a slower rate. For example, if B equals 8, then processing can be carried out by a single set of processing stages operating with 7.5 nanosecond to 8 nanosecond cycle times, or by two sets of processing stages operating at 15 to 16 nanosecond cycle times, or by four sets of processing stages operating at 30 to 32 nanosecond cycle times, or by eight sets of processing stages operating at 60 to 64 nanosecond processing times, or by even more stages. It will be appreciated that the selection of the number of processing stages is an implementation choice left to a practitioner skilled in the art of electronic circuit design.

It will be appreciated from the foregoing description that the introduction of blocking and the associated changes to the architecture and processing order of voxels have the effect of making it possible for a system based on Cube-4 to utilize burst mode for accessing DRAM. That is, it becomes possible in the subject invention to implement the large amounts of memory required to hold volume data sets utilizing inexpensive, readily available DRAM devices. This leads to substantial savings in cost, size, and power over previously implemented real-time volume rendering systems, and it makes it possible to implement practical and affordable real-time volume rendering systems for personal and desktop computing environments.

It will also be appreciated that as semiconductor technology advances and as it become possible to combine processing logic and DRAM on the same device or chip, the same architectural changes needed to enable burst mode DRAM access will be needed to enable direct, on-chip access by a processing pipeline to volume memory in an efficient and effective manner.

f) Communication between processing pipelines

From FIG. 12, and the discussion above, it can be seen that three kinds of data are passed from one pipeline to its neighbor in the current embodiment. This are voxels, samples, and partially accumulated pixel values. These are transmitted between pipelines via communication lines 76, 86, and 96, respectively. Moreover, for each kind of data there are two kinds of FIFO storage units, namely, beam FIFO storage units 78, 88, and 98 for voxels, samples, and pixels, respectively, and slice FIFO storage units 80, 90, and 100, respectively.

During every block cycle, $B^3$ voxels are fetched from volume memory 42. At the same time, $B^2$ voxels of array 142, $(B+1)^2$ voxels of array 144, and $B \times (B+1)$ voxels of array 146 are transmitted between two pipelines. That is, $$B^2+(B+1)^2+B\times(B+1)=3B^2+3B+1=(B+1)^3-B^3 \tag{5}$$

voxels are transmitted.

Similarly, during every block cycle, $B^3$ samples are obtained from the sample calculation stage of the pipeline, but $B^2$ samples of array 152, $2 \times (B+2)^2$ of array 154, and $2 \times B \times (B+2)$ samples of array 156 are transmitted between pipelines. This is, a total of $$2 \times B^2+2\times(B+2)^2+2\times B\times(B+2)=6B^2+12B+8=(B+2)^3-B^3 \tag{6}$$

samples must be transmitted.

Finally, during every block cycle, $B^3$ pixel values are calculated within the pipeline, but $B^2$ pixels values representing partially accumulated rays are needed from the left, $(B+1)^2$ pixels values representing partially accumulated rays are needed from above, and $B \times (B+1)$ pixel values are needed representing partially accumulated rays from the front. Thus, a total of $$B^2+(B+1)^2+B\times(B+1)=3B^2+3B+1=(B+1)^3-B^3 \tag{7}$$

pixels values must be transmitted between pipelines. It will be seen from Equations 5, 6, and 7 that the total number of items of data that must be transmitted between pipelines for each $B^3$ block of voxels is approximately proportional to $B^2$.

The following table displays values for Equations 5, 6, and 7 for block sizes ranging from 2 to 16.

| B | $B^3$ | $(B + 1)^3 - B^3$ | $(B + 2)^3 - B^3$ |
|---|---|---|---|
| 2 | 8 | 19 | 56 |
| 4 | 64 | 61 | 152 |
| 8 | 512 | 217 | 488 |
| 16 | 4096 | 817 | 1736 |

As can be seen from the table, as B grows, $B^3$ grows rapidly but Equations 5, 6, and 7 grow much more slowly. This is because for each cubic array of data fetched from memory or a previous stage, only a quadric number of voxels need to be transmitted between pipelines. For example, if a block has two voxels on each edge, then 23 or eight voxels must be fetched during a block cycle, but 19 voxels, 56 samples, and 19 pixels must be transmitted to the neighboring pipelines during the same block cycle. This is almost twelve times as much information communicated as fetched.

On the other hand, for B=8, for each 512 voxels fetched during a block cycle, 217 voxels, 488 samples, and 217 pixels must be transmitted to neighboring pipelines. The ratio of communicated values to fetched values in this case is about 1.8.

Therefore, a side effect of blocking is the reduction in the amount of information that must be transmitted between pipelines. This has the added benefit to the design of a semiconductor implementation of a processing pipeline because a reduction in the amount of communication is a reduction in the number of pins. It is also possible to reduce the bandwidths of pins rather than their number.

From FIG. 8, it will be appreciated that the prior art Cube-4 system requires communication lines between adjacent processing pipelines, pipelines that are a distance of two from each other, and in the case of the compositing unit 68, pipelines that are a distance of three from each other. The total number of pins required is slightly under two hundred for eight-bit voxels and nearly four hundred for sixteen-bit voxels. By contrast, in the current embodiment with B=8, and assuming 16-bit voxels and samples and 48-bit pixels, the total number of pins required is 192, that is, 96 pins leading to the pipeline on each side.

It will be appreciated from the method of block skewing in the subject invention that once rendering coordinates have been chosen, a ray may passing through a particular block will exit that block and may enter any one of seven other blocks, namely the three adjacent blocks to the right, below, or behind the given block, the three blocks with edges adjacent to the right bottom, right back, and bottom back edges of the given block, or the block with a top, left, front corner adjacent to the bottom, right, rear corner of the given block. These seven blocks are processed by at least three different processing modules, but possibly as many as five.

Whereas in the Cube-4 system, each processing pipeline requires direct connections to all five, in the subject invention this is not necessary. Instead, all communication necessary to forward voxel and sample values and partially accumulated rays is accomplished by the forwarding of arrays of these values to nearest neighbors. Values needed by more distant pipelines, that is by pipelines that are not nearest neighbors, are forwarded in several steps, but will always arrive that the destination pipeline in time.

g) Sectioning

In the subject invention, each processing pipeline includes internal storage or memory to hold data values transmitted from one pipeline to the next. These data values are retained this memory until needed for processing a subsequent beam or subsequent slice of blocks. In the current embodiment, this internal memory takes the form of beam FIFO storage units 78, 88, and 98 and slice FIFO storage units 80, 90, and 100. Each FIFO storage unit is an internal memory unit that implements the well-known technique of First-In, First-Out memory management. That is, new data is always written to unused memory locations. When previously stored data is read, its memory locations become unused again and are available for new data. The control of a FIFO storage unit guarantees that data items can only be read in the order that they are written.

In the current embodiment, each beam FIFO storage unit includes a capacity to store data for $\div(B \times P)$ blocks to be processed later, where L is the width of the volume data set being rendered, B is the number of voxels on the edge of a block, and P is the number of processing pipelines in the volume rendering system. The amount of data stored per block in FIFO storage units 78 and 98 are arrays of size $(B+1)^2$ data elements, the amount of data stored per block in FIFO storage unit 88 is an array of size $2 \times (B+2)^2$ data elements. Thus the total amount of internal storage for beam FIFO storage units is approximately $L \times B \div P$.

In the case of slice FIFO storage units 80, 90, and 100, each includes a capacity for $L \times M \div (B^2 \times P)$ blocks to be processed later, where M is the height of the volume data set. The amount of data stored per block in FIFO storage units 80 and 100 are arrays of size $B \times (B+1)$ data elements, the amount of data stored per block in FIFO storage unit 88 is an array of size $2 \times B \times (B+2)$ data elements. Thus the total amount of internal storage for beam FIFO storage units is approximately $L \times M \div P$.

In other words, the storage capacities of beam FIFO storage units are proportional to the width of the volume data set, while the capacities of slice FIFO storage units must be proportional the area of the face of the volume data. In the case of cubic volume data sets, that is volume data sets with the same number of elements on each edge, these storage requirements are independent of view direction. But in the cases of general volume data sets shaped like rectangular solids of arbitrary proportions, the storage requires vary with view direction.

It will be appreciated that in the prior art Cube-4 system and in other embodiments of the subject invention, the internal storage requirements are approximately the same. That is, beam storage is proportional to the width of the volume data set, and slice storage is proportional to the area of the face of the volume data set. It will also be appreciated that the storage requirements for slice FIFO units dominates all others.

Moreover, the total amount of storage can be very large. In the current embodiment, with voxels and samples needing 16 bits of storage and partially accumulated pixels need 32 bits of storage, more than 1.5 megabits of internal storage are required per pipeline to render a $256^3$ data set with four processing pipelines. In current semiconductor technology suitable for implementing processing elements, this would result in a very large and therefore very expensive chip.

Figure 18A:
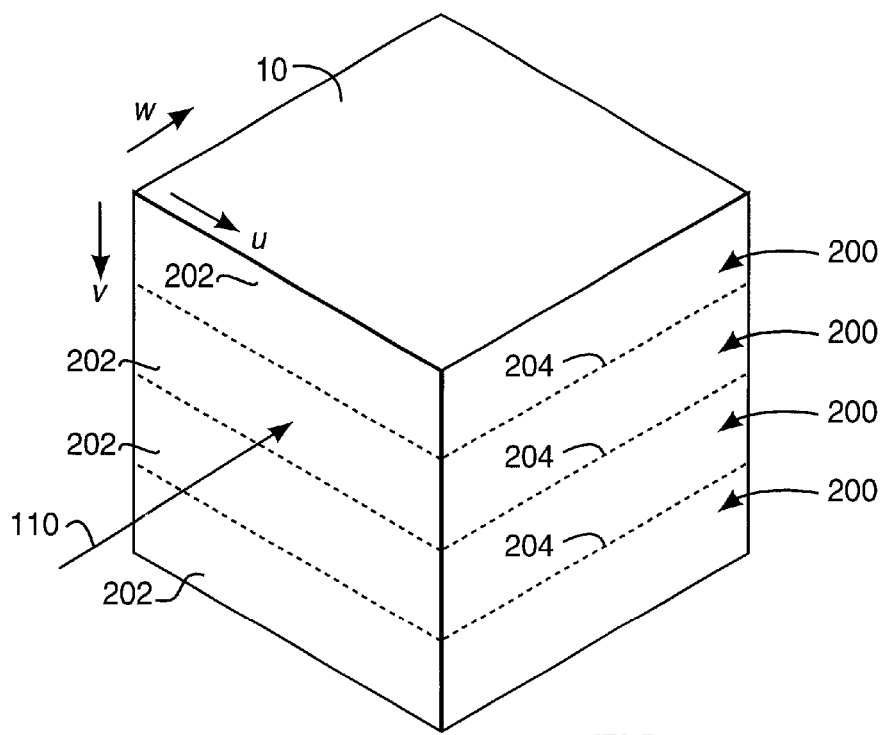
FIG. 18 is a diagrammatic illustration of three volume data sets, each subdivided into sections.
Figure 18B:
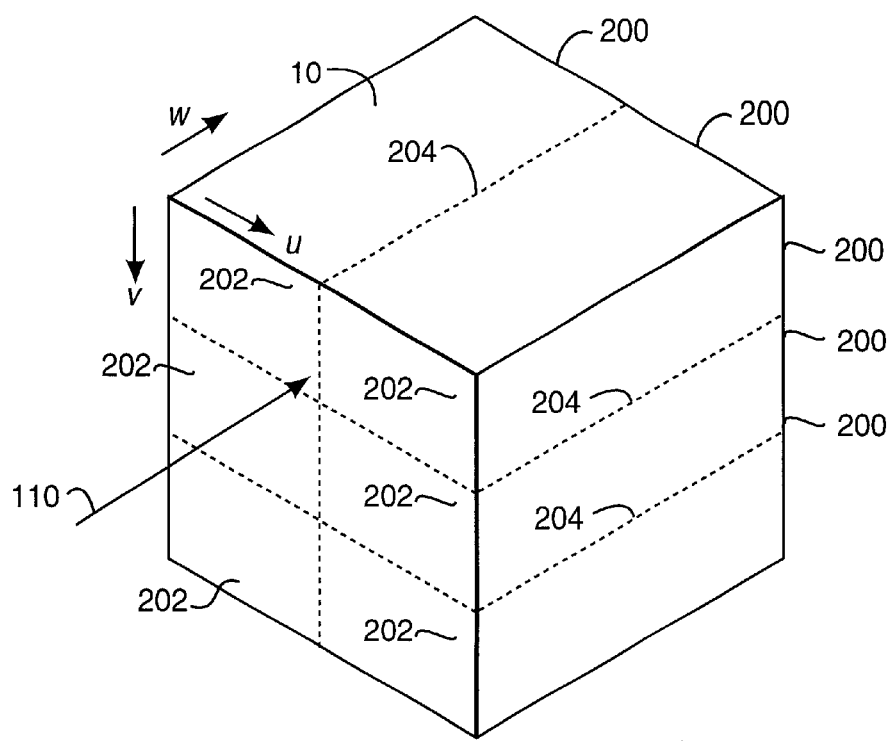
Figure 18C:
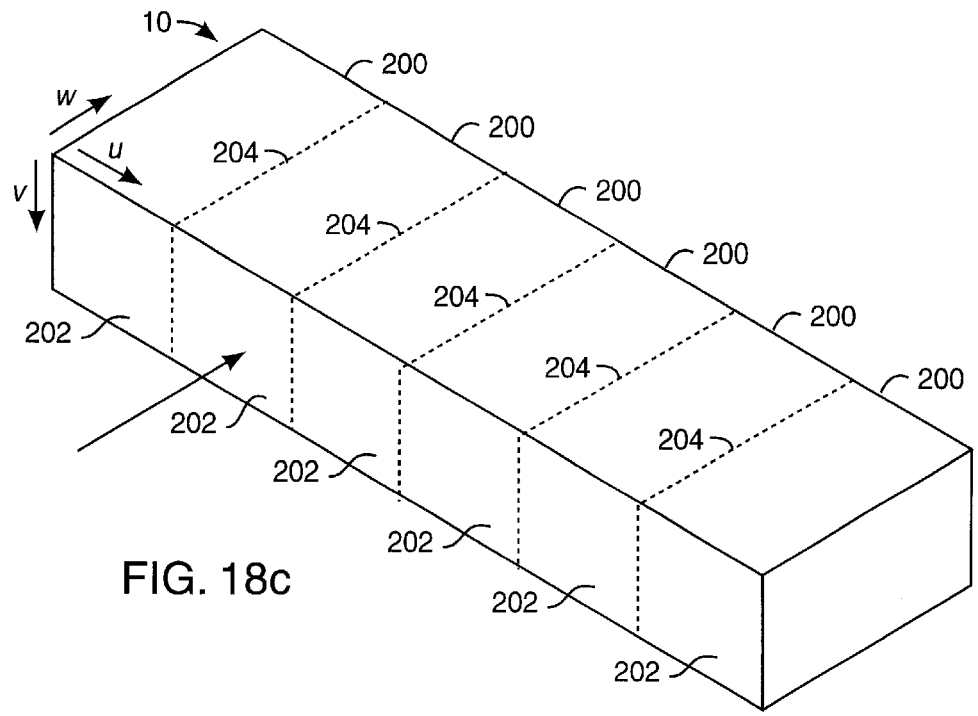

To alleviate this problem, the subject invention renders a volume data set in pieces or "sections" in such a way as to reduce the area of the face of each section to a more manageable value. This reduces the amount of internal storage needed because each section is rendered as a separate volume data set. FIGS. 18A–18C depicts three example volume data sets in rendering coordinates, each to be rendered from view direction 110. FIG. 18A is partitioned into equal horizontal sections 200. Each section is a "slab" of data from front to back in the rendering coordinates. The amount of internal storage required for slice FIFO units is proportional to the area of each section face 202.

In FIG. 18B, the volume data set 10 is partitioned in both the u and v dimensions into rectangular sections that extend from front to back. Again, the amount of slice FIFO storage used for rendering each section is proportional to the area of the face. In FIG. 18C, the volume data set is a long, thin rectangular solid to be rendered from its long side. In the case, the data set is partitioned into sections with square faces side-by-side. In all three cases, the amount of internal storage used for rendering is reduced to an amount proportional to the areas of the faces 202 of the sections.

If the view direction 110 is exactly perpendicular to each section face 202, then the images resulting from rendering each section can be placed side-by-side or one above the other to produce a correctly rendered image of the entire volume data set. That is, in the case a perpendicular view direction, rendering in sections is exactly equivalent to rendering the data set as a whole.

However, if the view direction is not perpendicular to each face, then some rays will pass through the boundaries 204 between sections. In this case, partially composited or accumulated rays that exit the side or bottom of a section and into an adjacent section are stored temporarily until the rendering of that section is complete. They are then used to continue the accumulation of rays in the adjacent sections.

Figure 19:
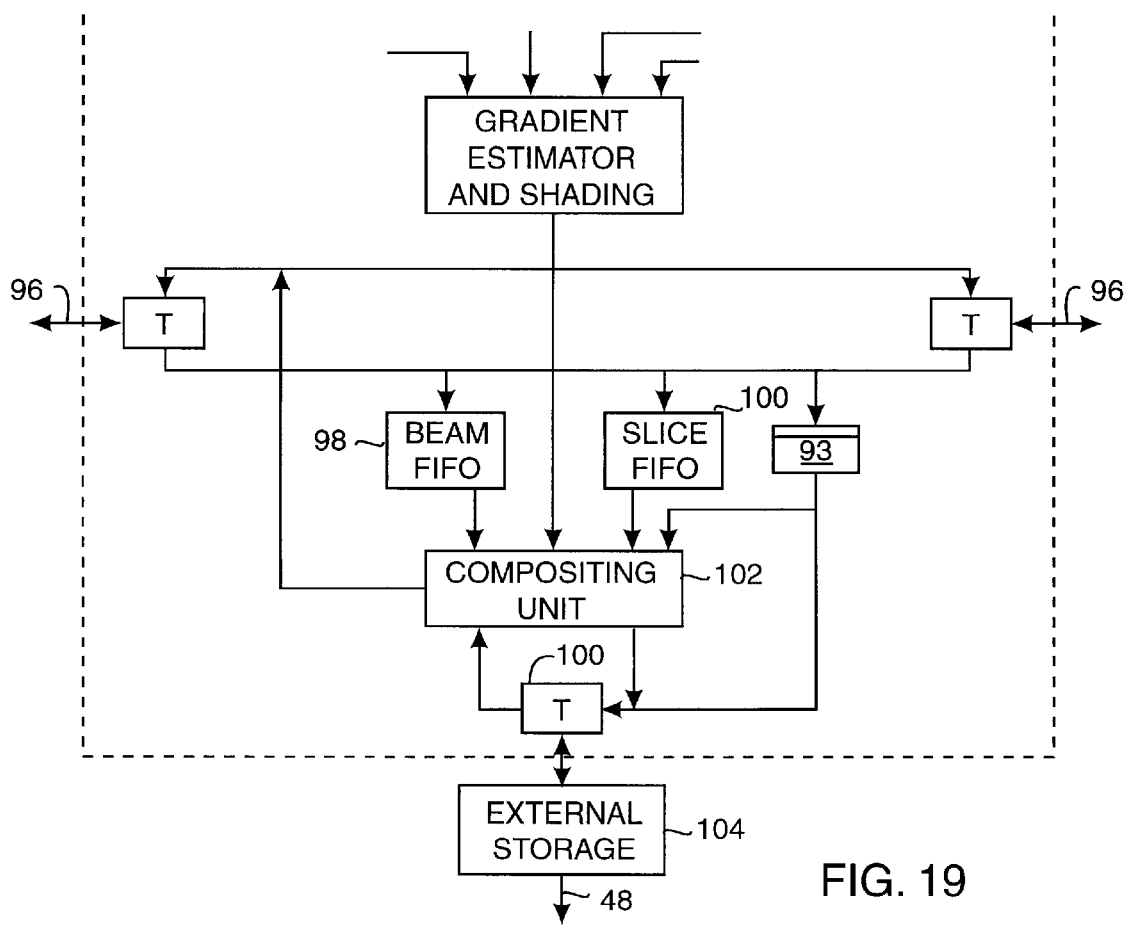
FIG. 19 is a block diagram of modifications to the illustration of FIG. 12 showing changes needed to implement the technique of sectioning.

In the subject invention, partially accumulated rays are stored outside of rendering pipelines in external storage modules. Referring now to FIG. 19, a modification of the lower portion of FIG. 12 is shown. In this modification, compositing unit 102 is coupled to external storage module 104 via tri-state unit 106. Tri-state units 94 connecting pixel communication lines 96 are also coupled to tri-state interface 106. External storage module 104 is then coupled to rendering output 48.

During rendering operation, when compositing unit 102 sends a partially accumulated pixel value to its neighboring pipeline below or to the right, if that pixel value represents a ray leaving right or bottom side of the section currently being rendered and if that ray will enter the left of top side of an adjacent section, then the neighboring pipeline writes the pixel value to external storage module 104 via tri-state interface 106. Then, when rendering the adjacent section, pixel values of partially accumulated rays that enter the section from the left or above are read from the external storage unit 104 instead of from optional delay 93 or beam FIFO storage 98. Pixel values representing rays that leave the entire volume data set are also written to external storage module 104, then forwarded to pixel output lines 48.

In the subject invention, external storage is implemented utilizing burst mode DRAM chips. The amount of storage required is proportional to the areas of the bottom and right faces forming the boundaries of sections. For example, if a cubic data set with N voxels on each edge is divided into horizontal sections as in FIG. 18A, then each boundary 204 will have at most $N^2$ pixels. The actual number of pixels needing to be stored between sections depends upon the viewing angle. Perpendicular viewing directions require no pixels to be stored externally, which viewing angles at 45 degrees to the boundary of a section require that $N^2$ pixels be stored.

It will be appreciated that to correctly accumulate rays at the boundaries of sections 204, sample points must be calculated between the right or bottom plane of voxels of one section and the top or left plane of the adjacent section. The calculation of these samples uses voxel values from both sections. Similarly, gradients are estimated for sample valued both between sections and for the sample values within each section nearest the boundary 204. This estimation uses sample values from both sections.

In some embodiments of the subject invention, these voxel and sample values required for the calculations near the section boundaries are stored in external storage 104 along with pixel values of partially accumulated rays. In preferred embodiments, however, these voxel and sample values are obtained by re-reading and re-rendering the voxels near the boundary of the section. This has the effect of refilling the beam FIFO storage units with the appropriate intermediate values needed to calculate the samples and gradients near a section boundary 204.

It will be appreciated that the technique of sectioning can be utilized for rendering volume data sets that are too large to fit into volume memory all at once. A large data set would be subdivided into sections, each of which is small enough to fit into volume memory and each of which has a face that is small enough to render within the limits of internal storage. Then each section is rendered separately, and its rendered image is accumulated in external storage modules 104. After a section is rendered, it is replaced in volume memory with an adjacent section which is then rendered separately. Pixel values of partially accumulated rays are passed from one section to the next via the same mechanism as described above, including the re-reading and re-processing of voxels near the boundary. This process is repeated until the entire volume data set is rendered. It will be appreciated that in cases of very large data sets, it is impractical to achieve the full real-time rendering rate of 30 frames per second.

h) Mini-blocking

In the subject invention as described thus far, voxels are read from voxel memory a block at a time. That is, each read operation fetches $B^3$ voxels in one block cycle. This is more than needed to re-process the voxels near the boundary of a section. For example, if B equals 8, then 512 voxels are read in a block cycle. However, only two or three planes of voxels are needed along the boundary for reprocessing, that is, only 128 or 192 voxels. The requirement to read 512 voxels at a time in order to process only 128 or 192 voxels is a waste of time.

To reduce this waste, the subject invention utilizes a technique called "mini-blocking." In this technique, voxels are stored in with a block in smaller blocks of "mini-blocks" of size 2×2×2 voxels each, that is a total of eight voxels in a mini-block. The entire block is then a cubic array of mini-blocks. Each mini-block is stored at consecutive locations in volume memory, so that it can be fetched in burst mode. The mini-block size is chosen to be at least as large as the minimum burst size of some burst mode DRAM products. Therefore, the mini-blocks of a block can be read from volume memory in any order, and a subset of a block can be read whenever appropriate.

This technique is utilized when re-reading the voxels near the boundary of a section. Only as many mini-blocks as containing the voxels needed for re-processing are fetched.

It will also be appreciated that the sizes of block buffers can be reduced slightly by fetching mini-blocks in the order that voxels are processed within a block. That is, the rendering of a block begins at one side as soon as those voxels have been fetched. So long as fetching proceeds as fast as the processing of individual voxels, the two can proceed in lock step. Then, new voxels can be fetched into buffer areas for which processing is completed. This reduces the total amount of block buffer storage 72 needed for rendering.

Having now described a few embodiments of the invention, and some modifications and variations thereto, it should be apparent to those skilled in the art that the foregoing is merely illustrative and not limiting, having been presented by way of example only. Numerous modifications an other embodiments are within the scope of one of ordinary skill in the art and are contemplated as falling within the scope of the invention as limited only by appended claims and equivalents thereto.

What is claimed is:

1. An apparatus for rendering a volume data set including a plurality of voxels stored in a voxel memory, the apparatus comprising a plurality of pipelines operating in parallel, each pipeline comprising:

a buffer storing at least one block of at least two voxels of the volume data set;

an interpolation stage reading the at least one block of at least two voxels from the buffer;

a gradient estimation stage receiving an output from the interpolation stage;

a compositing stage receiving an output from the gradient estimation stage; and a plurality of interface devices, each interface device coupling a particular stage only to an adjacent identical stage in a neighboring pipeline, the interfaces coupling identical stages in a ring.

2. The apparatus of claim 1 wherein each interface device comprises a first tri-state interface device and a second tri-state interface device.

3. The apparatus of claim 1 implemented in a volume graphics system comprising P pipelines, wherein the volume data set comprises L×M×N voxels and each block comprises $B^3$ voxels, wherein the buffer is configured to store (L×M)÷($B^2$×P) elements, where each element comprises an array of B×(B+1) voxels.

4. The apparatus of claim 1, wherein the volume data set is arranged as a plurality of beams of voxels, and wherein the buffer stores one beam of voxels.

5. The apparatus of claim 4 implemented in a volume graphics system comprising P pipelines, wherein the volume data set comprises L×M×N voxels of data, and wherein the buffer is configured to store L÷(B×P) elements, wherein each element is an array of B×(B+1)$^2$ voxels.

6. The apparatus of claim 1 wherein the volume data set is arranged as a plurality of slices, and wherein the buffer stores one slice of voxels.

7. The apparatus of claim 6 implemented in a volume graphics system comprising P volume rendering pipelines, wherein the volume data set comprises L×M×N voxels and each block comprises $B^3$ voxels, wherein the buffer is configured to store (L×M)÷($B^2$×P) elements, where each element is an array of 2×B×(B+2) voxels.

8. The apparatus of claim 1, further comprising:
a delay unit coupled between a previous stage and a next stage of the same pipeline for temporary storage of output from the previous stage.

9. The apparatus of claim 1 further comprising pixel memory receiving an output of the compositing stage.

10. A method for rendering a volume data set including a plurality of voxels stored in a voxel memory, comprising the steps of:
storing blocks of at least two voxels of the volume data set in a buffer;
processing multiple blocks, in parallel, in a plurality of pipelines connected to the buffer, the processing in each pipeline comprising the steps of:
interpolating each block read from the buffer in a first stage of the pipeline to produce samples;
estimating a gradient for each sample in a second stage of the pipeline;
compositing the samples and gradients in a third stage of the pipeline to produce pixels; and
interfacing a particular stage only to one adjacent identical stage in a neighboring pipeline, the interfacing coupling identical stages in a ring.

\* \* \* \* \*